(12) United States Patent
Prevost et al.

(10) Patent No.: US 8,566,414 B2
(45) Date of Patent: Oct. 22, 2013

(54) SYSTEMS AND METHODS FOR SUBSCRIPTION MANAGEMENT IN A MULTI-CHANNEL CONTEXT AWARE COMMUNICATION ENVIRONMENT

(71) Applicant: Freedomone Mobile, Inc., Montreal (CA)

(72) Inventors: Michel Prevost, Gatineau (CA); Pierre Paul Samson, Lancaster (CA); Francis Beaulieu, Montreal (CA); Yves Perron, Mont-Royal (CA)

(73) Assignee: Freedomone Mobile, Inc., Montreal (CA)

( * ) Notice: Subject to any disclaimer, the term of this patent is extended or adjusted under 35 U.S.C. 154(b) by 0 days.

(21) Appl. No.: 13/792,920

(22) Filed: Mar. 11, 2013

(65) Prior Publication Data

US 2013/0191481 A1 Jul. 25, 2013

Related U.S. Application Data

(60) Provisional application No. 61/713,090, filed on Oct. 12, 2012.

(51) Int. Cl.
*G06F 15/16* (2006.01)
(52) U.S. Cl.
USPC ........... 709/207; 709/202; 709/203; 709/223; 709/227; 709/230; 709/240; 709/244; 709/249
(58) Field of Classification Search
USPC ......... 709/202, 203, 223, 227, 238, 249, 207
See application file for complete search history.

(56) References Cited

U.S. PATENT DOCUMENTS

| 5,611,050 | A | * | 3/1997 | Theimer et al. | 709/202 |
|---|---|---|---|---|---|
| 6,226,377 | B1 | | 5/2001 | Donaghue, Jr. | |
| 6,263,364 | B1 | | 7/2001 | Najork et al. | |
| 7,272,662 | B2 | * | 9/2007 | Chesnais et al. | 709/246 |
| 7,631,047 | B1 | * | 12/2009 | Adamczyk et al. | 709/207 |
| 7,685,265 | B1 | * | 3/2010 | Nguyen et al. | 709/223 |
| 7,788,333 | B2 | * | 8/2010 | Adamczyk et al. | 709/207 |
| 7,941,578 | B2 | | 5/2011 | Kimoto et al. | |
| 8,195,738 | B2 | * | 6/2012 | Trivedi | 709/203 |
| 8,423,457 | B1 | | 4/2013 | Schattauer et al. | |
| 2008/0307139 | A1 | | 12/2008 | Thomas | |

(Continued)

FOREIGN PATENT DOCUMENTS

EP 1091307 A2 4/2001

*Primary Examiner* — Michael Won
(74) *Attorney, Agent, or Firm* — Choate Hall & Stewart LLP; William R. Haulbrook

(57) ABSTRACT

A method may include receiving, via a first network, a message identifying an event, where the event is associated with an entity, and the event is destined for at least one user. The method may include determining, by a processor of a computing device, a type of the event, and accessing, by the processor, a user profile associated with a first user of the at least one user, where the user profile associates the first user with the entity. The method may include determining, by the processor, a communication channel for delivering information associated with the event to the first user, where the user profile includes an association between the communication channel and the type of the event. The method may include forwarding, via a second network, to the first user, the information associated with the event, where the information associated with the event is forwarded via the communication channel.

19 Claims, 15 Drawing Sheets

(56) References Cited

U.S. PATENT DOCUMENTS

| | | |
|---|---|---|
| 2009/0028183 A1 | 1/2009 | Landers et al. |
| 2009/0049202 A1* | 2/2009 | Pattison et al. ............... 709/249 |
| 2010/0063989 A1* | 3/2010 | Mehta et al. .................. 709/202 |
| 2011/0047221 A1 | 2/2011 | Watanabe et al. |
| 2011/0209159 A1 | 8/2011 | Baratz et al. |
| 2011/0246377 A1* | 10/2011 | Buchhop et al. .............. 705/304 |
| 2012/0172058 A1* | 7/2012 | O'Reilly .................... 455/456.3 |
| 2012/0197975 A1 | 8/2012 | Samson et al. |
| 2012/0278513 A1 | 11/2012 | Prevost et al. |

* cited by examiner

FIG. 3B

| EDIT SUBSCRIBER ⌄ | | | | | | 400 |
|---|---|---|---|---|---|---|

PERSONAL INFORMATION 402     COLLAPSE SECTION ^

SUBSCRIBER ID: <USERNAME>

FIRST NAME*: ☐    MIDDLE NAME*: ☐    LAST NAME*: ☐

| HOME | WORK | ADD NEW |
|---|---|---|

ADDRESS: ☐ ☐
CITY: ☐    PROVINCE/STATE: ☐
COUNTRY: ☐    POSTAL CODE/ZIP: ☐

COMMUNICATION PREFERENCES 404    COLLAPSE SECTION ^

SELECT YOUR PREFERRED CHANNEL OR ADD A NEW ONE ⌒ 410    DEFAULT CHANNEL - EMAIL

✉ JOHN@EMAIL.COM ⌄ ⚙ +    e JOHN@EMAIL.COM ⚙ +    🌐 514 369 8596 ⚙ +
408b    408a    408d    408c    408f    408e

💬 514 369 8596 ⌄ ⚙ +    🐦 @JOHNSMITH ⚙ +    📱 MOBILE APP ⚙ +

NOTIFICATION SERVICES 406    COLLAPSE SECTION ^

41 ITEMS FOUND

| | TOTAL | GROUP |
|---|---|---|
| > | 3/6 | CAR LOAN *412a* |
| > | 5/7 | MORTGAGE *412b* |
| ⌄ | 4/12 | BANK ACCOUNT *412c* |

12 SERVICES FOUND, DISPLAYING 1 TO 5.   ITEMS PER PAGE 5 ⌄    FIRST ◁ 1 2 > LAST

| ○ | NOTIFICATION *414* | ACCOUNT NUMBER *416* | SINCE *418* | REQUIRED *420* |
|---|---|---|---|---|
| ● | FRAUD ATTEMPT DETECTION | 450 896 365776554 | 📅 | 💬 ✉ |
| ○ | MINIMUM AMOUNT ALERT | 514 896 475757789 | | 💬 |
| ○ | 10% CREDIT LEFT | 450 896 3657576554 | | ✉ |
| ● | CHECK EMISSION COUNTER | 514 896 4787567679 | 📅 | 💬 ✉ |
| ○ | HOUSE LOAN | 450 896 365767554 | | ✉ |

| > | 4/7 | HOME EQUITY CREDIT *412d* |
|---|---|---|
| > | 5/9 | CREDIT CARD *412e* |

FIG. 4

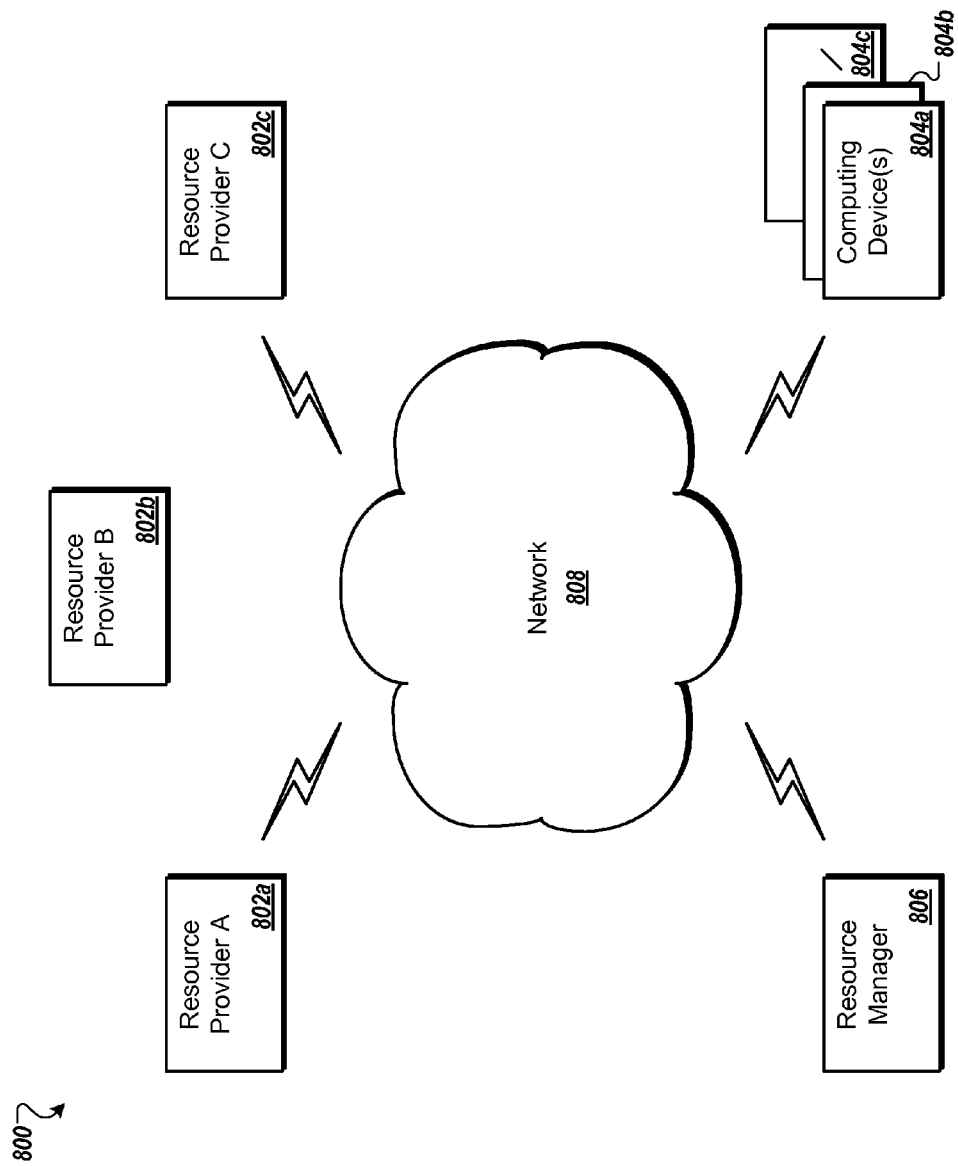

SYSTEMS AND METHODS FOR SUBSCRIPTION MANAGEMENT IN A MULTI-CHANNEL CONTEXT AWARE COMMUNICATION ENVIRONMENT

RELATED APPLICATIONS

This application is related to and claims priority from U.S. Provisional Application No. 61/713,090 entitled "Systems and Methods for Subscription Management in a Multi-Channel Context Aware Communication Environment" and filed Oct. 12, 2012, the contents of which are hereby incorporated by reference in its entirety.

BACKGROUND

Communication between customers and organizations may occur in a piecemeal fashion. Customers may send e-mails to the organization, visit the organization's website, and/or call the organization's customer service line. Organizations may send information to customer's e-mail addresses and/or call customers. Information about customers and the organizations may be lost between such communications. Customers may become frustrated with duplicate requests for information (e.g., between branches of an entity, between a telephone help desk and a web site, etc.).

There is a need for a solution that supports the sharing of information between a customer and an organization without losing the context of historical and recent activity that involved different communication means and different departments of the organization.

SUMMARY

In general overview, the systems and methods of the present disclosure enable organizations to leverage different communication channels with a customer (e.g., individual, business partner, client, employee, enterprise client system, machine controlled by any of the above) to distribute information effectively and efficiently. Customers (also referred to herein as "users") may subscribe to a multi-channel communication platform service. When subscribing, customers may create user profiles. The user profiles may include the channels of communication through which the users consent to contact. For example, users may provide their mobile telephone numbers through which they consent to receive short message service (SMS) communications, landline telephone number through which they consent to receive interactive voice response (IVR) communications, e-mail addresses through which they consent to receive e-mail, identifiers for mobile computing device on which they consent to receive customized information on mobile applications, social network accounts through which a user consents to receive information posts, or any other information related to communication.

In one aspect, the present disclosure relates to a method including receiving, via a first network, a message identifying an event, where the event is associated with an entity, and the event is destined for at least one user. The method may include determining, by a processor of a computing device, a type of the event, and accessing, by the processor, a user profile associated with a first user of the at least one user, where the user profile associates the first user with the entity. The method may include determining, by the processor, a communication channel for delivering information associated with the event to the first user, where the user profile includes an association between the communication channel and the type of the event. The method may include forwarding, via a second network, to the first user, the information associated with the event, where the information associated with the event is forwarded via the communication channel.

In some embodiments, the communication channel is one of a telephone number, an email address, a social networking account, a software application, and a machine-to-machine alias. Forwarding the information associated with the event may include forwarding the event as one of an SMS message, an email message, and a social networking message. The type may include a priority level. The user profile may include an association between the communication channel and a notification service provided by the entity.

In some embodiments, the method includes, prior to determining the communication channel, determining, by the processor, a second communication channel, where the second communication channel is determined based in part upon the type of the event and based further in part upon the user profile, where the user profile identifies the second communication channel as a primary communication channel. The method may include forwarding, via a third network, the information associated with the event, where the information associated with the event is forwarded via the second communication channel, and receiving, via the third network, an indication of failure of delivery of the information associated with the event via the second communication channel. The second network may be the third network.

In some embodiments, the first network is the second network. The method may include, prior to forwarding the information associated with the event, formatting the information associated with the event based at least in part upon the communication channel. A message content associated with the event may include a rich media format, the second communication channel includes an SMS message, and formatting the information associated with the event may include reducing the message content to plain text.

In some embodiments, the method includes logging, by the processor, data regarding the event, where the data is associated with the user profile. The data may include a timestamp and at least a portion of the information associated with the event.

In some embodiments, the method includes receiving, via the first network, a second event, where the second event is associated with a second entity, and the second event is destined for the first user. The method may include determining, by the processor, a type associated with the second event, where the type associated with the second event is different than the type associated with the event. The method may include accessing, by the processor, the user profile associated with the first user, determining, by the processor, based at least in part upon the type of the second event, the first user has not designated a communication channel corresponding to the second event, and discarding, by the processor, the second event.

In some embodiments, the entity is at least one of a) a financial institution, b) a retail organization, c) a government organization, d) a medical organization, and e) an employer of the first user. The event may include one of a) an account statement, b) information regarding a financial transaction, c) medical record information, and d) information regarding government records.

In one aspect, the present disclosure relates to a system including a processor and a memory, the memory storing instructions that, when executed by the processor, cause the processor to receive, via a network, identification of a number of communication channels associated with a user, where the number of communication channels include at least one of an email address, a telephone number, a social media account, a software application, and a machine-to-machine alias. The instructions, when executed, may cause the processor to create a user profile including the number of communication channels, receive an indication of a number of associations, where each association of the number of associations correlates a respective communication channel with a respective event type, where each event type of a number of event types includes at least one of an entity, a service type, and a priority, and store information regarding the number of associations in the user profile. The instructions, when executed, may cause the processor to receive an event destined for the user, determine a type of the event, where the number of event types includes the type, and, based upon the user profile, match the type of the event to a first communication channel of the number of communication channels. The instructions, when executed, may cause the processor to forward information associated with the event via the first communication channel.

In some embodiments, the first communication channel includes a software application, the method further including receiving, from a separate computing device executing the software application, peripheral data, where the peripheral data is obtained from a peripheral feature of the separate computing device, identifying, based at least in part upon the peripheral data, one or more contextual events, and providing, for presentation to the user via at least one communication channel of the number of communication channels, information associated with the one or more contextual events. The peripheral feature may include one of a geolocation feature, an electronic wallet feature, a near field communication feature, an optical imaging feature, a graphic image capture feature, an audio capture feature, and a biometric feature. The peripheral data may be obtained prior to forwarding the information associated with the event via the first communication channel. Providing the information associated with the one or more contextual events may include forwarding the information associated with the one or more contextual events via the first communication channel.

In some embodiments, the instructions, when executed, cause the processor to access user data from a storage device, where identifying the one or more contextual events includes identifying a first contextual event of the one or more contextual events based further in part on the user data. The user data may include historic peripheral data.

In one aspect, the present disclosure relates to a non-transitory computer readable medium having instructions stored thereon, where the instructions, when executed by a processor, cause the processor to receive, via a network, identification of a number of communication channels associated with a user, where the number of communication channels include at least one of an email address, a telephone number, a social media account, a software application, and a machine-to-machine alias. The instructions, when executed, may cause the processor to create a user profile including the number of communication channels, and receive an indication of a number of associations, where each association of the number of associations correlates a respective communication channel with a respective event type, where each event type of a number of event types includes at least one of an entity, a service type, and a priority. The instructions, when executed, may cause the processor to store information regarding the number of associations in the user profile, receive an event destined for the user, and determine a type of the event, where the number of event types includes the type. The instructions, when executed, may cause the processor to, based upon the user profile, match the type of the event to a first communication channel of the number of communication channels, and forward information associated with the event via the first communication channel.

In some embodiments, each communication channel of the number of communication channels includes a privacy level, and forwarding the information associated with the event via the first communication channel includes securing the information associated with the event relative to the privacy level of the first communication channel. Each service type may include a privacy level, and forwarding the information associated with the event via the first communication channel may include securing the information associated with the event relative to the privacy level of a respective service type of the event.

In one aspect, the present disclosure relates to a method including receiving, via a network, user profile information including a number of information items, where a first information item of the number of information items includes at least one of a user name, a birth date, a home address, an account number, an image file, an audio file, a video file, and a biometric value. The method may include creating, by a processor of a computing device, a user profile including the number of information items, where creating the user profile includes associating, with each information item of the number of information items, at least one of a creation date, an expiration date, a privacy level, and a security level. The method may include identifying, by the processor, availability of a new identification object, where the new identification object is provided on behalf of an entity, determining, by the processor, that the user profile is associated with the entity, and alerting, via a communication channel associated with the user profile, the user to the availability of the new identification object. The method may include, responsive to alerting the user of the availability of the new identification object, receiving new user profile information related to the new identification object, and populating, by the processor, the new identification object with the new user profile information, where a respective privacy level of the new information object allows for sharing of the new user profile information with one or more additional entities different than the entity. The method may include providing, based at least in part upon the respective privacy level of the new information object, the new user profile information to at least one of the one or more additional entities.

In some embodiments, the method includes, prior to providing the new user profile information to at least one of the one or more additional entities, receiving, from the at least one of the one or more additional entities, a request for access to the new identification object. The method may include, after populating the new identification object, receiving an update to the new identification object, where the update includes a modification to one or more of the respective privacy level and the respective security level, and associating, by the processor, update information with the new identification object, where the update information includes one or more of an update date, an update timestamp, and an updator. The updator may include the entity.

In some embodiments, associating update information with the new identification object includes associating an initial value with the new identification object. Creating the user profile may include distributing one or more information items of the number of information items, between two or more storage regions. Each storage region of the two or more storage regions may include a different security level for protecting stored information. Each storage region of the two or more storage regions may include a different access technique for accessing stored information.

In some embodiments, providing the new user profile information to the at least one of the one or more additional entities includes allocating compensation for sharing the new user profile information. The compensation may include one or more of a points value, a coupon, and a gift certificate. Allocating compensation may include adding funds to a financial account associated with the user profile.

In one aspect, the present disclosure relates to a non-transitory computer readable medium having instructions stored thereon, where the instructions, when executed by a processor, cause the processor to receive, via a network, identification of a number of communication channels associated with a user, where the number of communication channels include at least one of an email address, a telephone number, a social media account, a software application, and a machine-to-machine alias. The instructions may cause the processor to create a user profile including the number of communication channels, receive an indication of a number of associations, where each association of the number of associations correlates a respective communication channel with a respective priority, and store information regarding the number of associations in the user profile. The instructions may cause the processor to receive, from a separate computing system, an event destined for the user, where the event is associated with an entity and a service level. The instructions may cause the processor to, based upon the user profile, identify a first communication channel of the number of communication channels for issuing information associated with the event to the user, where identifying the first communication channel includes matching a service level of the event with a priority of the first communication channel. The instructions may cause the processor to forward information associated with the event to the user via the first communication channel, where the entity is kept unaware of the first communication channel.

In some embodiments, the instructions, when executed, further cause the processor to, responsive to forwarding the information associated with the event, receive, via a second communication channel of the number of communication channels, a response to the event, and responsive to receiving the response, provide information associated with the response to the entity, where the entity is kept unaware of the second communication channel. The instructions, when executed, may further cause the processor to receive, from the separate computing system, a second event, where the second event is destined for the user, and the second event is associated with a second service level different than the service level. The instructions may cause the processor to access the user profile, determine, based at least in part upon the second service level, the user has not designated a corresponding communication channel for delivering the second event, and discard the second event.

In one aspect, the present disclosure relates to a system including a processor, and a memory, the memory storing instructions that, when executed by the processor, cause the processor to receive, via a network, identification of a number of financial accounts associated with a user, where the number of financial accounts include at least one of a bank account, a credit card account, a savings account, a checking account, and an electronic wallet account. The instructions may cause the processor to populate a user profile associated with the user with the number of financial accounts. The instructions may cause the processor to receive an indication of a number of associations, where each association of the number of associations correlates a respective financial account with at least one of a respective entity, a respective priority level, and a respective usage type, and store information regarding the number of associations in the user profile. The instructions may cause the processor to receive a payment request associated with the user profile, determine a first financial account of the number of financial accounts corresponding to the payment request, where the payment request identifies at least one of an entity, a priority level, and a usage type, and provide, for use by one of a requestor associated with the request and a payor identified by the request, account information associated with the first financial account.

In some embodiments, the account information includes one or more of an account number, an account passcode, an expiration date, a verification code, and a communication channel for authorization. The usage type may include at least one of personal use and business use. The priority level may identify one of a primary financial account of the number of financial accounts and a secondary financial account of the number of financial accounts.

In one aspect, the present disclosure relates to a non-transitory computer readable medium having instructions stored thereon, wherein the instructions, when executed by a processor, cause the processor to receive, via a network, identification of a plurality of communication channels and a plurality of information items associated with a user, wherein a first information item of the plurality of information items comprises at least one of a user name, a birth date, a home address, an account number, an image file, an audio file, a video file, and a biometric value. The instructions, when executed, may cause the processor to create a user profile comprising the plurality of communication channels and the plurality of information items, wherein creating the user profile comprises associating, with each information item of the plurality of information items, at least one of a creation date, an expiration date, a privacy level, and a security level. The instructions, when executed, may cause the processor to receive an indication of a plurality of associations, wherein each association of the plurality of associations correlates a respective communication channel with at least one of an entity, a service type, a security level, and a priority level, and store information regarding the plurality of associations in the user profile. The instructions, when executed, may cause the processor to receive an event destined for the user, match the event to a first communication channel of the plurality of communication channels, wherein the event is matched to the first communication channel based at least in part on one or more of a respective entity, a respective service type, a respective security level, and a respective priority level of the event, and forward information associated with the event via the first communication channel.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIGS. 3A through 3F illustrate a series of example user interfaces for subscription management in a multi-channel context aware communication environment;

FIG. 4 illustrates an example entity-specific user interface for subscription management in a multi-channel context aware communication environment;

FIG. 8 is a block diagram of a network environment for establishing a multi-channel context aware communication environment.

Figure 1:
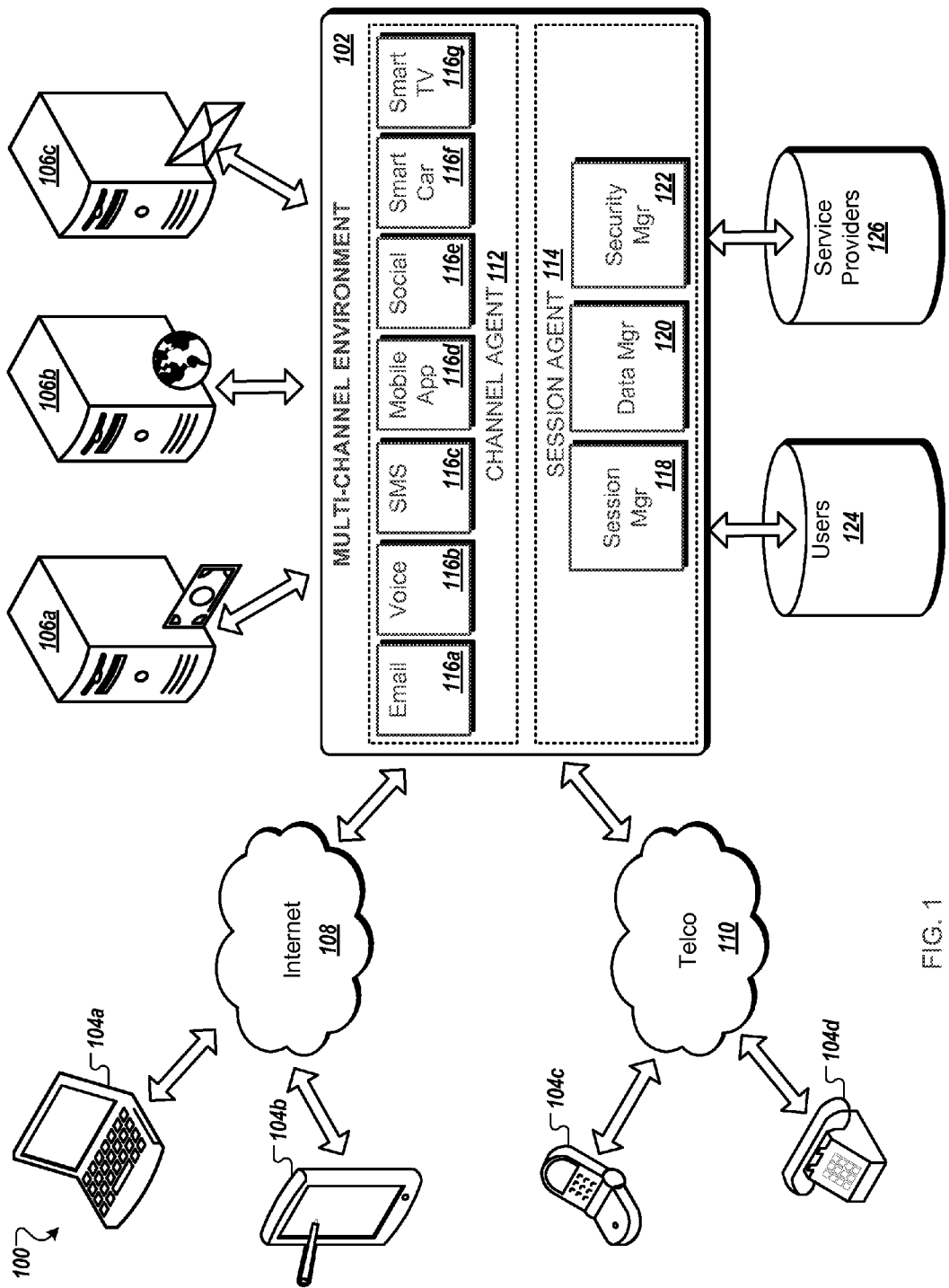
FIG. 1 is a block diagram of an example system for subscription management in a multi-channel context aware communication environment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

FIG. 1 is a block diagram of an example system 100 for subscription management in a multi-channel context aware communication environment. The system 100 includes a multi-channel communication environment 102 for distribution of communications from one or more communication sources 106 to a variety of user communication devices 104, where the user communication devices 104 may connect to the multi-channel communication environment 102 via a variety of communication networks, such as the Internet 108 or a telecommunications network 110 (e.g., plain old telephony service (POTS), public switched telephone network (PSTN), Global System for Mobile Communications (GSM), universal mobile telecommunications system (UMTS), Mobile WiMAX, Long Term Evolution (LTE), etc.). A user, in some implementations, connects to a channel agent 112 of the multi-channel communication environment 102 to configure a number of communication channels 116 for distribution of information provided by at least one of the one or more communication sources 106. The communication channels 116, in some examples, can include an email channel 116a, a voicemail channel 116b, a text message channel 116c, a mobile application channel 116d, and a social networking channel 116e. In further examples, the communication channels 116 can include a machine-to-machine (e.g., device alias) channel such as a smart car channel 116f, and a smart TV channel 116g. In some implementations, a user may configure one or more of a particular type of communication channel 116. For example, the user may configure two or more email addresses 116a for distribution of information.

Conversely, a particular communication source 106, such as a financial server 106a, a Web portal 106b, or a message server 106c, may provide a user the opportunity to configure one or more communication channels 116 for distribution of information from the particular communication source. For example, a user may establish an account with the multi-channel communication environment 102 via an interface provided by a bank associated with the financial server 106a. The interface, for example, may be included in a web page or mobile application provided by the bank to the user. Through the interface, the user may opt to receive, for example, fraud warnings via the SMS channel 116c, monthly statements via the email channel 116a, and offers for new products via the mobile application channel 116d.

In some implementations, the channel agent 112 provides the user with configuration tools to configure a particular channel 116 (e.g., email address, telephone number, social networking account, etc.) with a particular type of communication. The type of communication, for example, may include a priority of information or a source of information. For example, communications regarding a credit card may be directed to the SMS channel 116c, while communications regarding new offers from the user's bank may be directed to a personal email account (e.g., email channel 116a). Specific user settings are stored, for example, within a user profile data store 124.

In some implementations, the configuration tools include tools for populating and managing information items related to a user profile such as, in some examples, user demographic information (e.g., name, address, birth date, marital status, number of children, pets, etc.), work experience information (e.g., company name, work address, education level, degree, graduation year, post-secondary school name(s), field of employment, etc.), and account information (e.g., awards member identifier, credit card number, bank account number, library card number, student identification, employee identification, eWallet account identification, medical insurance identification, dental insurance identification, etc.). The information items can include one or more of text information, image files, video files, and/or audio files.

In some implementations, information items include security information such as, in some implementations, biometric identification information (e.g., fingerprint information, voiceprint information, retina scan information, etc.), and password information.

Information items in either the user profile or security information can be encrypted with an encryption key based, for example, on authentication best practice: "Something you know, Something you own, Something you are".

Each information item, in some implementations, is associated with a security level. For example, the user may adjust a security level associated with individual information items to restrict access to a particular communication source or group of communication sources.

In some implementations, one or more of the information items is associated with one or more dates such as, in some examples, a creation date, an update date, and an expiration date. For example, account information (e.g., a credit card number) may be associated with an expiration date. In another example, biometric information may be associated with an update date such that the user may identify if/when a particular biometric information item was updated.

In some implementations, one or more of the information items is associated with an original status. For example, if a user modifies the security level of the information item, the user may review (and, optionally, revert to) an original security level associated with the information items (e.g., a default designated by the originating communication source or by the multi-channel communication environment).

In some implementations, the user is provided the opportunity to associate two or more channels 116 with a particular message type or message priority. For example, upon fraud detection, the user may opt to receive both an automated voice message via the IVR channel 116b and a scrolling message via the smart TV channel 116g. In another example, the user may associate a primary channel 116 and a secondary channel 116 with a particular message type or message priority. For example, upon failure of distribution of a monthly bank statement message via the primary channel 116 (e.g., personal email address), the message may be re-distributed via the secondary channel 116 (e.g., work email address). Other configurations are possible.

In some implementations, the channel agent 112 provides the user with configuration tools to instruct correspondence providers, such as providers of email accounts and social networking accounts, to forward correspondence and/or other communications (e.g., posts, events, etc.) to the multi-channel communication environment 102. In this manner, for example, the user may review aggregated information associated with multiple communication channels via a unified user interface provided by the multi-channel communication environment 102.

Service providers, when communicating with users via the multi-channel communication environment 102, may distribute events (e.g., notifications, messages, application updates, etc.) via a session agent 114 of the multi-channel communication environment 102. Upon receiving an event from one of the communications sources 106, a security manager 122 of the session agent 114 may validate the originator of the event (e.g., based upon information stored within a service providers data store 126). The security manager 122 may also look up and validate a designed recipient (e.g., based upon information stored within the user profile data store 124).

In some implementations, the designated recipient includes a recipient list maintained by the multi-channel communication environment 102. For example, a data manager 120 of the session agent 114 may associate an event type or event priority with a number of users affiliated with the source service provider. If, for example, a portion of the members of a health insurance organization opt for nutrition updates, the data manager 120 may access the relevant recipient list.

Upon identifying the one or more recipients of the event, in some implementations, a session manager 118 identifies at least one channel 116 for distributing the event to each of the one or more recipients. For example, a first recipient may designate a particular email address as the distribution channel 116a, while a second recipient may designate a social media account as the distribution channel 116e. The session manager 118, in some implementations, establishes a communication session for providing the event to a respective recipient via a respective designated channel 116.

In some implementations, the data manager 120 conforms the event to a format compatible with the designated channel 116. For example, a rich media format may be appropriate for distribution via the email channel 116a or social networking account channel 116e, while a plain text format may be appropriate for distribution via the SMS channel 116c. In some implementations, the communications source 106 provides two or more versions of an event, for distribution based upon the designated channel 116. The data manager 120, for example, may select the appropriate event version based upon the designated communication channel 116.

In some implementations, the communications source 106 is unaware of the type of communication channel used to communicate a particular event with a particular user. For example, the communications source 106 may identify a user via a unique identifier known by the multi-channel communication environment 102. The multi-channel communication environment 102, in turn, may provide information to the user on behalf of the communication source 106 via an appropriate communication channel 116 (e.g., as configured by the user).

In some implementations, the session manager 118 opens a workflow associated with the event, such that the recipient may respond to the event in a manner that maintains a context with the original message. For example, upon receipt of a fraud detection alert, the user may respond via the same channel or a different channel while maintaining the fraud message context. In a particular example, a user may receive a fraud detection alert via the email channel 116a registered by the user. The fraud message, in this circumstance, would be distributed via the internet 108 (e.g., to a personal computer 104a or tablet computer 104b). In response, the user may be provided with dial-in information, for use via the voice channel 116b registered by the user, to contact the service provider through the multi-channel communication environment 102. The user may connect to the multi-channel communication environment 102 via the telecommunications network 110 (e.g., using a cellular phone 104c or land line phone 104d). Upon recognition of the voice channel 116b communication, the session agent 114 may correlate the voice channel 116b communication with the initial fraud detection alert and channel the voice session to the service provider (e.g., via the appropriate communication source 106). The service provider, in this circumstance, may receive an indication (e.g., message identifier, brief information message, etc.) regarding the context of the voice session.

In some implementations, the multi-channel communication environment 102 masks the identity of the communication channel from the communication source 106. For example, if the user responds to an event via an email channel, the multi-channel communication environment 102 may forward information contained within the e-mail correspondence while removing the email address. In this manner, communication sources 106 may provide information to users without directly compiling communication channel data (e.g., email addresses, social network account user names, etc.) regarding the users, thus protecting the privacy of the users from unauthorized distribution of communication channel information.

The data manager 120 of the session agent 114, in some implementations, logs information regarding the information session (e.g., transmission of the event to the recipient, follow-on response from the recipient to the service provider, etc.) to an account associated with one or more of the recipient and the service provider. For example, a recipient may access an account with the multi-channel communication environment 102 to review information regarding events distributed to the recipient via the multi-channel communication environment 102. In some implementations, the data manager 120 maintains copies of at least a portion of the events distributed to the user via the multi-channel communication environment 102. For example, the data manager 120 may maintain all personal (e.g., not group broadcast) events distributed to a particular user, such as, in some examples, dental appointment reminders, cable television bills, and credit card purchase confirmations. Furthermore, the data manager 120 may maintain anonymous information regarding communications transferred via the multi-channel communication environment 102, for example for statistical purposes.

In some implementations, the data manager 120 logs information regarding access of information items. For example, if a communication source accesses demographic information, the user may be able to review log information regarding one or more information items accessed, which communication source accessed the information item(s), and/or a timestamp when the communication source accessed the information item(s). The user, in some implementations, may be alerted upon access to particular information item(s) (e.g., highly secure items such as a social security number, credit card number, etc.). The user, in some implementations, is prompted for permission prior to a communication source accessing a particular information item. For example, based upon a privacy level and/or security level associated with a particular information item, permission may be requested of a user (e.g., via one or more designated communication channels) prior to the multi-channel communication environment 102 sharing the information stored within the information item with a particular (e.g., new) communication source.

In some implementations, the multi-channel communication environment 102 issues original events to a user via one of the channels 116. For example, upon identification of failure to communicate via a particular channel 116 registered by the user, the multi-channel communication environment 102 may issue an event via a separate communication channel 116 (e.g., a default channel or a secondary channel to the channel 116 exhibiting communication failure), alerting the user to the failure. In some implementations, the session manager 118 initiates communications with users regarding failed communication channels 116. In another example, the multi-channel communication environment 102 may issue an access alert upon access (or attempt to access) of secure information by a communication source.

Implementations of session management and workflow management in relation to the multi-channel communication environment are described in greater detail in U.S. application Ser. No. 13/231,801, entitled "Multi-Channel Context Aware Communication Technology" and filed Sep. 13, 2011, and U.S. application Ser. No. 13/487,931, entitled "Priority Scheduling for Multi-Channel Context Aware Communication Technology" and filed Jun. 4, 2012, the contents of each of which are hereby incorporated by reference in their entireties.

Advantages and potential uses of the multi-channel communication environment 102 are illustrated within the following example. A user Bob is a customer of GenericBank. He has a variety of different financial accounts with this bank, including a checking account, a savings account, a credit card, a car loan, a mortgage and a retirement savings plan. He uses each of the accounts for different purposes, at different times, and he has different concerns about each of the accounts. For example, he uses his checking account regularly, but accesses his savings account infrequently. He's recently become concerned that someone might have fraudulently gained access to his credit card information, causing concern about illicit charges appearing on the credit card account. He has regular debits automatically processed on behalf of his car loan and mortgage. He is a little anxious about the performance of his retirement plan, so he likes to keep an eye on the money in the retirement plan account.

Bob wants different information about each of these accounts. For some of the accounts, he wants to be notified immediately in the case of certain events; for other accounts, he is perfectly content to get around to reading a monthly summary at his leisure. He wants to be able to control exactly how and when he is notified about his accounts, and he wants to be able to control the communication channels by which his bank contacts him about his accounts.

The multi-channel communication environment 102 can provide Bob with the ability to manage all of his accounts and the events he receives about those accounts individually and in precise detail. For example, Bob can decide for each account what events he wants, and how he wants to receive updates. In a particular example, Bob can get an e-mail record of his monthly debits from his checking account to pay for his car loan and mortgage via the email channel 116a, and he can be notified immediately by SMS in the event of a use of his credit card via the SMS channel 116c.

Any time Bob wants to change the communication channels 116 or events for his accounts, he can access a portal to the multi-channel communication environment 102 licensed to his bank or, in other implementations, he can access a user account with the multi-channel communication environment 102 directly. Through interaction with a few simple configuration tools provided by the multi-channel communication environment 102, Bob can make the changes he wants and confirm the configuration modification(s) through the associated communication channel(s) 116 in a matter of moments. Once confirmed, the changes to the configuration can take place automatically. In this way, Bob gains unprecedented direct control over how he is informed about the state of his financial affairs. Example user interfaces for establishing communication channels and account settings are provided below in relation to FIGS. 3A through 3F.

Figure 2:
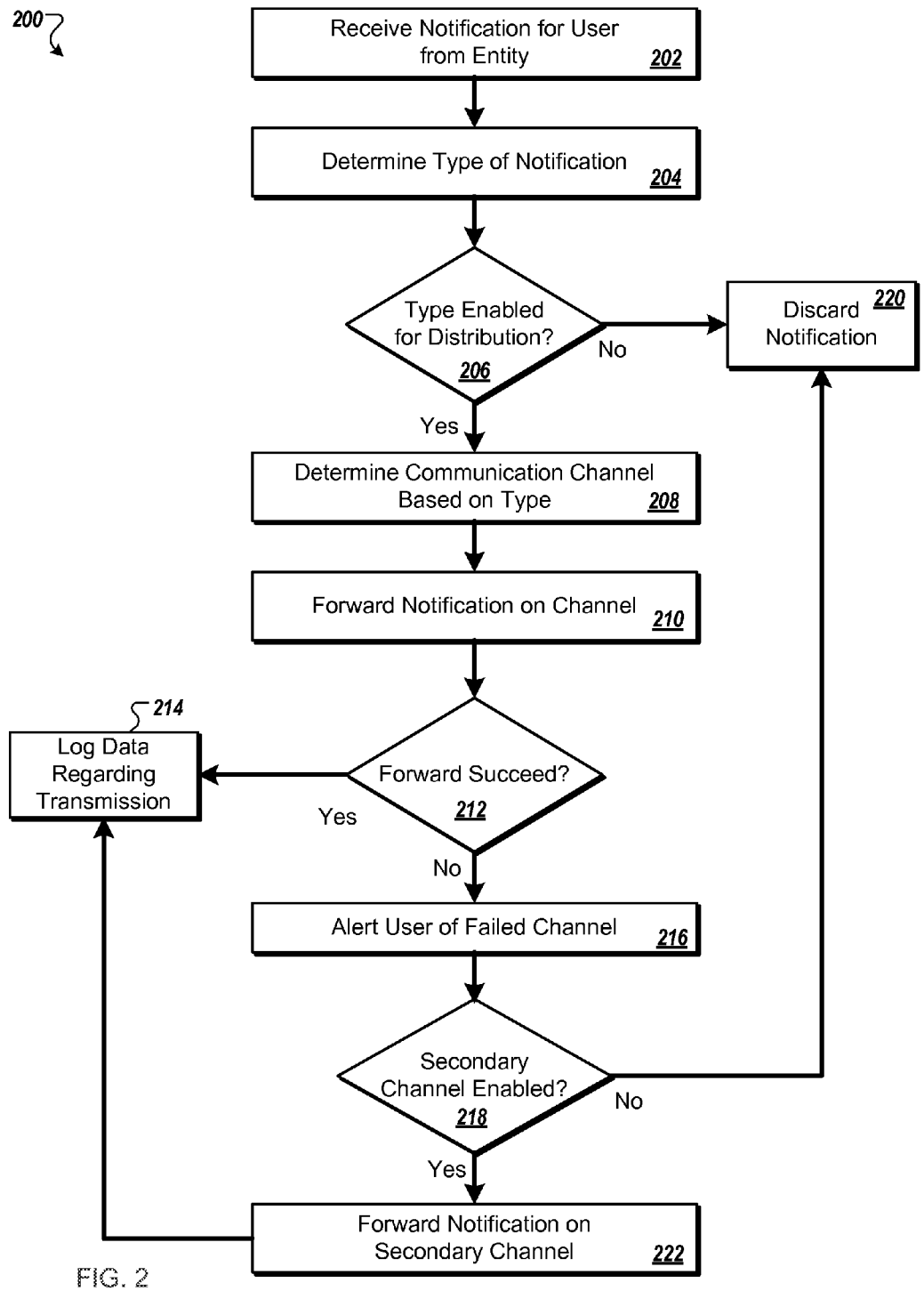
FIG. 2 is a flow chart of an example method for managing communication of events within a multi-channel context aware communication environment.

FIG. 2 is a flow chart of an example method 200 for managing communication of events (e.g., messages) within a multi-channel context aware communication environment. The method 200, for example, may be performed by the session agent 114 as described in relation to FIG. 1.

In some implementations, the method 200 begins with receiving an event from an entity destined for at least one user (202). The event, in some implementations, is received by the multi-channel communication environment 102 from one of the communication sources 106, as described in relation to FIG. 1. The event, for example, may include any digital content such as, in some example, text, video, and audio content. In some implementations, two or more versions of the event may be received from the entity. For example, different versions of the event may be prepared from the entity based in part upon different communication channels available to the user for receipt of events. In a particular example, an audio event may be prepared for provision via an IVR channel, a rich media event may be prepared for provision via an email channel, and a plain text event may be prepared for provision via a SMS channel.

In some implementations, a type of event is determined (204). The session agent 114 (described in relation to FIG. 1), in some implementations, determines the event type. The type, in some examples, may pertain to the content (e.g., category of message topic) and/or a priority of the event (e.g., high importance, medium importance, low importance, etc.). In some implementations, the entity designates a type regarding the event. For example, the entity may submit the event to the multi-channel communication environment via a messaging service that provides for the attachment or flagging of a priority or type. In some implementations, the type of the message may be derived by the multi-channel communication environment. For example, based upon one or more of a subject line, recommended communication channel (e.g., recommended by the entity), recipient list, or other contextual information, the multi-channel communication environment may identify the type of the event.

If the message type matches a type enabled for distributions (206), in some implementations, a communications channel is determined based in part upon the type of the event (208). In some implementations, the session manager 118 (described in relation to FIG. 1) determines the communications channel. The session manager 118, for example, may determine the particular communication channel 116 via the channel agent 112. The user, in some implementations, selects whether or not to receive various types of information. For example, the user may select to receive personal reminders from a local government agency, such as fee payment reminders, renewal reminders, and information requests.

However, the user may decide not to receive broadcast information from the local government agency (e.g., public service events, etc.).

In some implementations, the user may have two or more communication channels associated with the particular type of event. For example, an employee of a consumer goods company may designate two different social networking accounts for distribution of marketing events such as product release announcements. The user, in some implementations, designates a primary communications channel and a secondary communications channel such that, if the primary channel fails (or if the user fails to respond within a certain amount of time to an event issued via the primary communication channel), the event is issued via the secondary communications channel.

In some implementations, the event is forwarded on the identified communication channel (210). In some implementations, the session manager 118, described in relation to FIG. 1, forwards the event on one or more identified communication channels 116. A communications channel, for example, may be established with one of a number of communications networks, depending upon the destination of the event.

The forwarding of an event via the communication channel may fail. In one example, a failure may occur by the destination being unreachable (e.g., telephone number disconnected, email server unreceptive or unresponsive, etc.). Failure, in some implementations, may be identified based upon failure of timely response by the user. In the circumstance of a high priority event that requires response by the user, for example, failure of response by the user after a predetermined period of time (e.g., five minutes, fifteen minutes, etc.) may be construed to be a failure in successful communication of the event.

If the forward does not succeed (212), in some implementations, an alert regarding the failed channel is distributed to the user (216). The alert, for example, may be distributed via a default channel, such as an email address provided by the user upon initiation of the user profile with the multi-channel communication environment. If the user has enabled a secondary communication channel (218), in some implementations, the event is forwarded on the secondary channel (222). Within configuration preferences, for example, a user may specify both a primary communication channel (e.g., telephone number for SMS message) and a secondary communication channel (e.g., email address). The user may designate both primary and secondary communication channels, for example, due to the priority of the event (e.g., to ensure prompt receipt of high priority information).

If the user has not designated a secondary channel (218), in some implementations, the event is discarded (220). If the event is of low priority, for example, the event may be discarded. In some implementations, rather than discarding the event, the event may be logged within the user account with the multi-channel communication environment, such that the user can access the event via the account at a later time. In some implementations, for example if the event is of a high priority, the method may include re-sending the event via the communication channel at a later time (e.g., after a predetermined period of time has elapsed, such as five, fifteen, or thirty minutes).

In some implementations, upon success of forwarding, either via the primary channel (210) or via the secondary channel (222), data regarding the transmission is logged (214). As stated above, the event may be logged within the user account with the multi-channel communication environment, such that the user can access the event via the account at a later time. For example, the user may access a multi-channel communication environment mobile application, log into a multi-channel communication environment web site, or access a multi-channel communication environment user account via an entity portal (e.g., an entity-specific mobile application or web site including access to account information in the multi-channel communication environment).

FIGS. 3A through 3F illustrate a series of example user interfaces for subscription management in a multi-channel communication environment. A user may access the user interfaces illustrated in FIGS. 3A through 3F, for example, to configure communication channels for delivery of events, review historical information regarding the distribution of events, sign up for event services with additional entities, and manage services provided by entities via the multi-channel communication environment. The user interfaces, in some examples, may illustrate graphical user interface screens of a website, web application, or mobile device application. Although illustrated in relation to a user managing preferences, communication channels, and entity services directly through the multi-channel communication environment, variations of the user interfaces described in relation to FIGS. 3A through 3F may be presented to a user via an entity-specific interface (e.g., entity website, entity mobile application, etc.) of an entity that has subscribed to the multi-channel communication environment to provide multi-channel event services to customers or members.

Figure 3A:
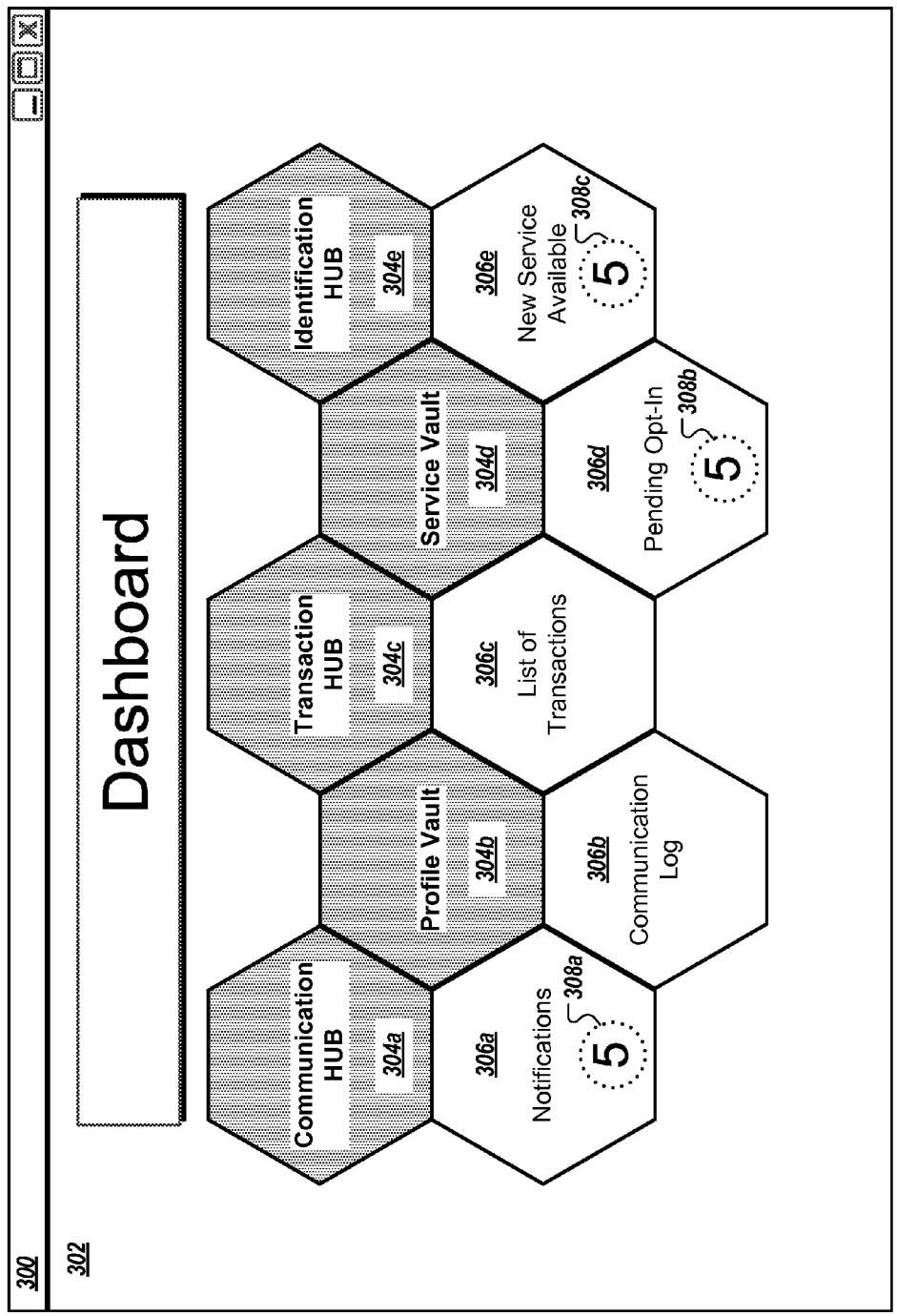

Turning to FIG. 3A, a first user interface 300 illustrates a main dashboard 302 for access to user information within the multi-channel communication environment. A user may be presented with the user interface 300, for example, upon logging into a user account with the multi-channel communication environment.

The main dashboard 302 illustrates a series of configuration categories 304 including a communications hub 304a, a profile vault 304b, a transaction hub 304c, a service vault 304d, and an identification hub 304e. Each of the configuration categories 304, upon selection, are operable to provide the user with configuration management in each of the separate categories. In some implementations, the number of configuration categories 304 available to a user may be based upon a service level associated with the user. For example, a customer of a retailer, bank or other financial (or transaction-based) organization affiliated with the multi-channel communication environment may have access to the transaction hub 304c, while a user affiliated only with an employer entity (e.g., for distribution of work-related event) may not have need for the transaction hub 304c. In another example, based upon entities affiliated with the user, the user may not be provided the opportunity to manipulate services using the service vault 304d.

Beneath the configuration categories 304, the main dashboard 300 includes a series of information categories 306. The information categories 306 include events category 306a, a communication log category 306b, a list of transactions category 306c, a pending opt-in category 306d, and a new service available category 306e. Each of the information categories 306, upon selection, are configured to present the user with details regarding the particular information category 306. In some implementations, one or more of the information categories 306, when selected, provide the user the opportunity to further configure the user account.

The events category 306a, when selected, in some implementations, provides the user with a view of pending and/or recently delivered events (e.g., in the last hour, 24 hours, week, etc.).

The communication log category 306b, upon selection, presents the user with information regarding correspondences via the multi-channel communication environment. For example, the communications log may present a summary of pending events, messages, posts, emails, and other information. The summary, for example, may identify events by communication channel, time, source entity, and type of communication (e.g., category and/or priority). The user, in some implementations, may select a particular notification from the summary to access additional details regarding the notification including, for example, a copy of the notification.

In some implementations, statistical information may be presented to the user via the communication log 306b. For example, the user may review a number of notifications delivered per communication channel (e.g., 19 posts to a first social networking account, 6 posts to a second social networking account, 11 emails to a first email address, etc.).

The list of transactions category 306c, in some implementations, provides the user, upon selection, with information regarding one or more transactions conducted via the multi-channel communication environment. The transactions, for example, may be conducted via payment instruments configured within the multi-channel communication environment such as a bank account, a credit card, or an electronic wallet (eWallet) account. In some implementations, statistical information may be presented to the user via the list of transactions category 306c. For example, the user may review a number of transactions conducted via each of the configured payment instruments.

The pending opt-in category 306d, when selected, in some implementations presents the user with one or more services for configuration. For example, the user may have configured a statement delivery service and fraud detection notification service with a bank via the multi-channel communication environment. The bank may additionally have an electronic payment service available for configuration. Upon viewing the pending opt-in category 306d, for example, the user may be presented the opportunity to configure communication channel information and other information for the electronic payment service. In some implementations, the pending opt-in category may present the user with one or more partially configured services.

The new service available category 306e, in some implementations, presents the user, upon selection, with one or more services recently added by one or more entities affiliated with the user. For example, if the electronic payment service described in relation to the pending opt-in category 306d were a new service, the electronic payment service may be presented to the user via the new service available category 306e.

In some implementations, the new service available category 306e is configured to present the user with services provided by additional entities (e.g., entities not yet affiliated with the user). For example, should a new retailer join the multi-channel communication environment, the user may be presented the opportunity to sign up for one or more services with the new retailer via the new service category 306e. In some implementations, new entities may be presented to the user based upon evidence of the user already being affiliated with the new entity. For example, based upon transaction information (e.g., collected in the list of transactions category 306c), the multi-channel communication environment may identify that the user has made one or more purchases from the new retailer.

In some implementations, a preview logo 308 may be presented to a user in relation to one or more of the information categories 306, for example to identify new information. For example, a preview logo 308a presented in relation to the notifications category 306a identifies to the user that five notifications are available for review. A second preview logo 308b, presented in relation to the pending opt-in category 306d, alerts the user that there are five services pending opt-in. A third preview logo 308c, presented in relation to the new service available category 306e, alerts the user that there are five new services available.

Returning to the configuration categories 304, each configuration category 304 will be described in detail below in relation to a corresponding configuration user interface. For example, upon selection of the identification hub 304e, the user may be presented with an identification hub user interface 310, as illustrated in FIG. 3B.

Figure 3B:
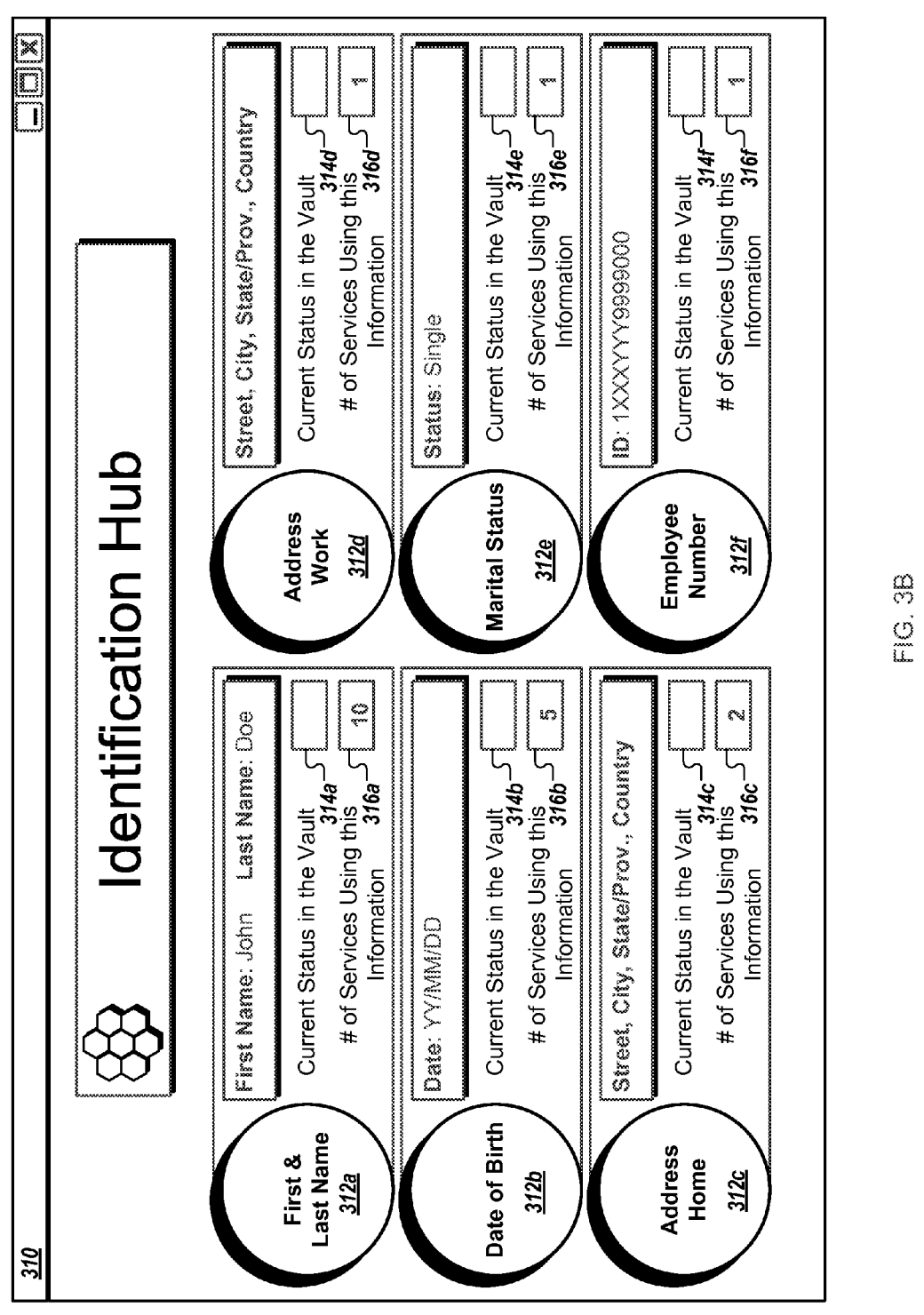

Turning to FIG. 3B, the identification hub user interface 310 includes a series of configuration controls 312 for configuring personal information (e.g., information items) regarding the user including a name control 312a, a date of birth control 312b, a home address control 312c, a work address control 312d, a marital status control 312e, and an employee number control 312f. The configuration controls 312 presented to the user, in some implementations, are presented based in part upon entities affiliated with the user. For example, an employee number control 312f may be presented to the user if the user is affiliated with an employer (e.g., signed up for one or more services provided by the user's employer) within the multi-channel communication environment.

Various personal information may be desired and/or required, for example depending upon the entities affiliated with the user. For example, as illustrated in relation to each of the series of configuration controls 312, a respective number of services using this information indicator 316 alerts the user to the number of services that are interested in accessing the personal information requested by the associated configuration control 312. In some implementations, the indicators 316 identify the number of services configured by the user that access the associated information. The indicators 316, in some implementations, identify the number of services available from the entities affiliated with the user that access the associated information. Upon configuration of a new service, in some implementations, the user is prompted to enter personal information used by the new service if this personal information has not yet been entered. For example, at a later time, the user may configure a service that makes use of the user's sex. During configuration of the new service, the multi-channel communication environment may prompt the user to enter information regarding sex. In some implementations, a user will be considered to be pending opt-in for a service until the requested personal information has been entered. For example, turning to FIG. 3A, the indicator 308b associated with the pending opt-in category 306d may identify that the user has not yet fulfilled the personal information requirements to enable one or more services.

Returning to FIG. 3B, in some implementations, a user may protect the information collected via the series of configuration controls 312 by setting individual privacy levels via a profile vault (described below in relation to FIG. 3E). As illustrated in relation to each of the series of configuration controls 312, a respective vault status indicator 314 indicates a current privacy status designated for the associated personal information requested by the respective configuration control 312. In some implementations, the privacy status includes a label designator (e.g., "public", "private", "secure", etc.). The privacy status, in some implementations, may be indicated by a color scheme (e.g., green for public information, yellow for private information, red for secure information, etc.). The privacy status, in some implementations, is configurable in part by the user, for example via the profile vault described in relation to FIG. 3E.

In some implementations, to protect a user's privacy in light of the personal information and other configuration information collected by the multi-channel communication environment, the multi-channel communication environment maintains a distributed, fragmented system such that the information items presented by the configuration controls 312 cannot be assembled by a hacker.

Figure 3C:
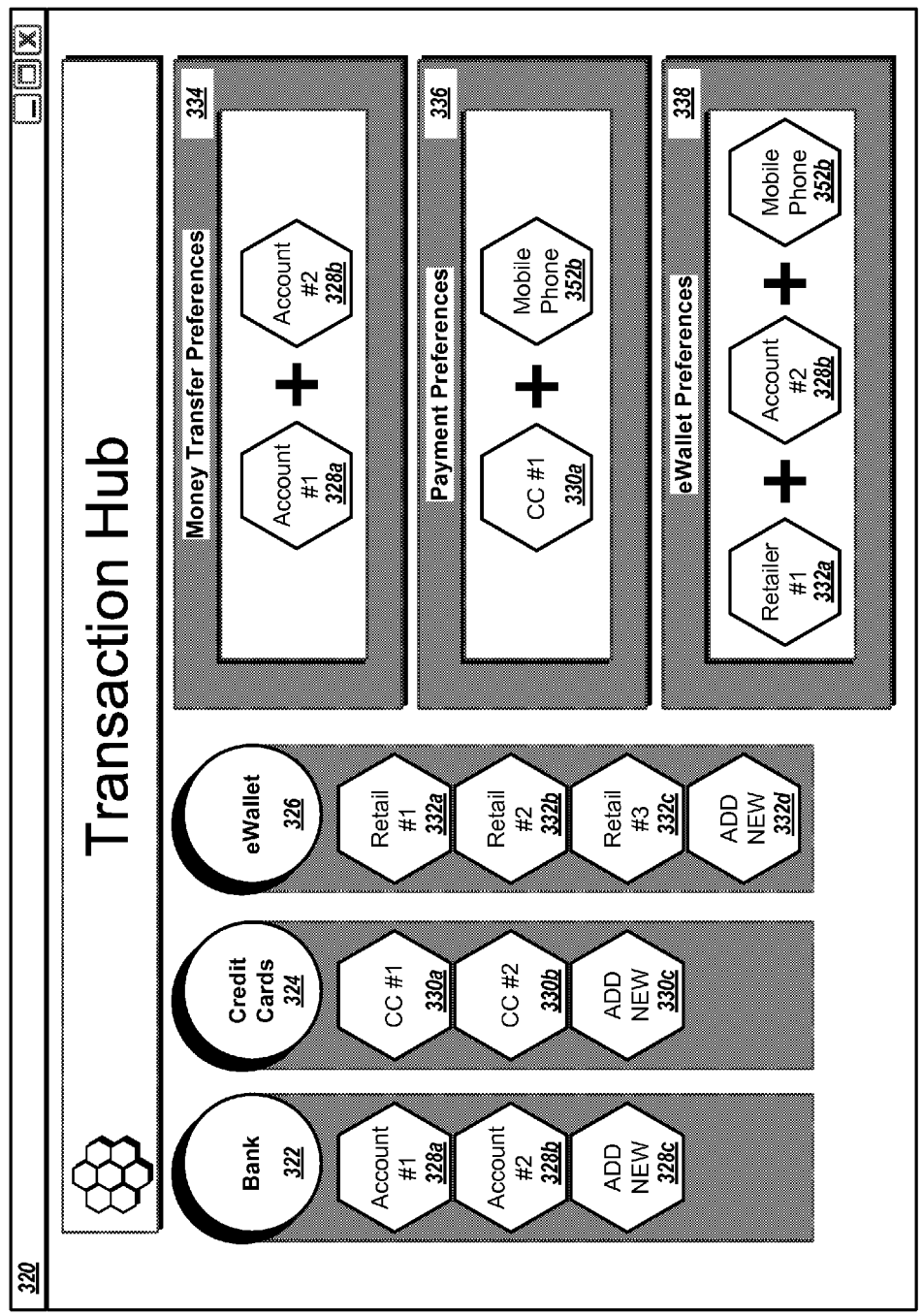
Figure 3D:
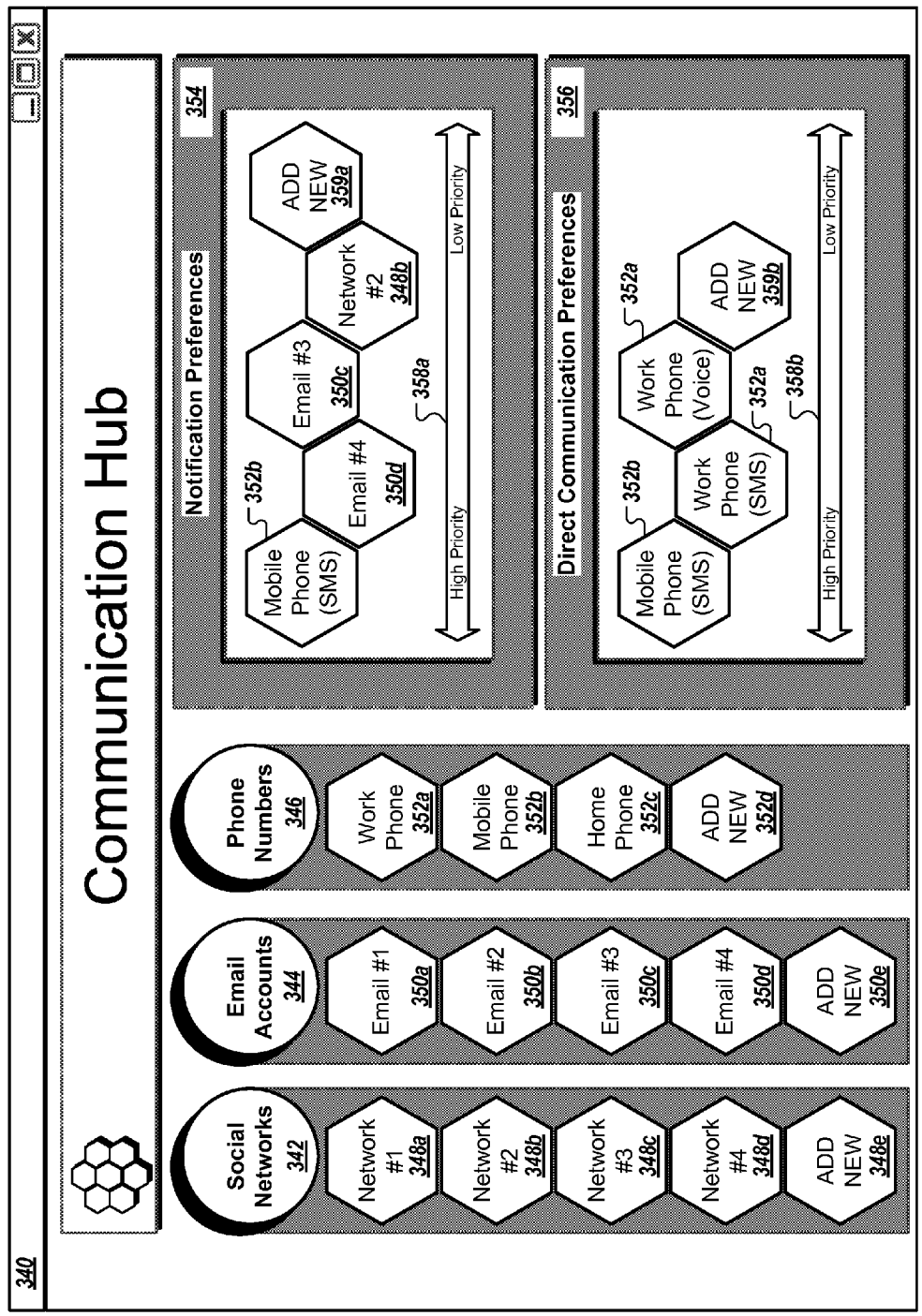

Returning to FIG. 3A, upon selection of the communication hub 304*a*, the user may be presented with a communication hub user interface 340, as illustrated in FIG. 3D. Turning to FIG. 3D, the communication hub user interface 340 includes a series of communication channel types, including a social network channel type 342, an email channel type 344, and a telephone channel type 346. Other communication channel types can include machine-to-machine communication channels such as, in some examples, a smart car or smart TV. The communication channel types 342, 344, 346, for example, may correlate to the communication channels 116 described in relation to FIG. 1. Any number of channels may be correlated to each channel type. For example, as illustrated in FIG. 3D, four different social networks 348 have been configured within the social network channel type 342. Furthermore, four different email addresses 350 have been configured within the email channel type 344, and three different phone numbers 352 have been configured within the telephone channel type 346.

Within each of the communication channel types 342, 344, and 346, the user is presented with an add new channel option 348*e*, 350*e*, 352*d*. Upon selection of one of the add new channel options 348*e*, 350*e*, 352*d*, in some implementations, the user is presented with a configuration interface to enter information regarding the new configuration channel.

In some implementations, one or more of the communication channels may be inactive. In some examples, a communication channel may be inactive until approved (e.g., a verification message is sent via the communication channel, and the user issues a response), if previously failed (e.g., phone number disconnected, email address bouncing, etc.) or if designated by other configuration parameters (e.g., certain channels disabled during the weekend, while on vacation, etc.). If a channel is inactive, in some implementations, the user interface presents a visual indication (e.g., "grayed out", different color, highlighted, etc.) to draw the user's attention to a potential problem with the communication channel. Additionally or alternatively, in some implementations, disabling of a communication channel may be presented to the user upon selection of the notifications category 306*a*, as shown in FIG. 3A.

Using the various communication channels configured (348, 350, 352), in some implementations, the user may designate different channels based upon notification priority. For example, within a notification preferences pane 354, a priority scale indicator 358*a* provides the user with a visual indication of relative priority of configured communication channels. In some implementations, the user may drag and drop communication channels 348, 350, 352 into the notification preferences pane 354. As illustrated, the user has configured, in order of priority, a mobile phone SMS channel 352*b* as the highest priority communication channel, email address #4 350*d* as the second highest priority communication channel, email address #3 350*c* as the third highest priority communications channel, and social network #2 348*b* as the low priority communications channel. As indicated within the notification preferences pane 354, the user has the opportunity to add a fifth communication channel 359*a* as the lowest priority communications channel. In some implementations, if the user does not designate a lowest priority communications channel, the multi-channel communication environment designates the lowest priority communications channel configured (e.g., the social network #2 348*b*) for receipt of the lowest priority notifications. In some implementations, failure to designate a communications channel for the lowest priority communications indicates that the user is not interested in receiving notifications designated as lowest priority. Similarly, should one of the configured communication channels become inactive, in some implementations the multi-channel communication environment may default to another configured channel (e.g., the next highest or next lowest in priority). In other implementations, upon inactivity of a configured communication channel, notifications of the corresponding priority may fail to be transmitted. In some implementations, the failed notifications may be reviewed at a later time, for example by selecting the communications log category 306*b* as illustrated in FIG. 3A.

Similar to the discussion with reference to the notification preferences pane 354, a direct communication preferences pane 356, in some implementations, allows the user to configure communication channels, on a priority scale indicated by a priority scale indicator 358*b*, for receipt of direct communications. As illustrated, three communication channels are configured, in order of preference: the mobile phone (SMS) channel 352*b*, and a work phone (SMS) channel 352*a*, and the work phone (voice communications) 352*a*. As with the notification preferences pane 354, the direct communications pane 356 includes an "add new" channel 359*b* for designating a lowest priority channel for direct communications.

In some implementations, the configuration presented within the notification preferences pane 354 and the direct communication preferences pane 356 provides communication channel preferences to the entities directing notifications and other communications to the user via the multi-channel communication environment. The multi-channel communication environment, in some implementations, additionally or alternatively includes features for individually configuring notification and/or direct communication preferences on a per-entity (or per-service) basis. Additionally, in some implementations, settings may be applied, in some implementations, on a system-wide or per-entity basis for designating behavior upon inactivity or failure of communication channels.

Returning to FIG. 3A, upon selection of the transaction hub 304*c*, the user may be presented with a transaction hub user interface 320, as illustrated in FIG. 3C. Turning to FIG. 3C, the transaction hub user interface 320 includes a series of payment instrument types, including a bank account type 322, a credit card type 324, and an electronic wallet type 326. The payment instrument types 322, 324, 326, for example, may be used in conducting transactions with an entity, such as the sources 106 described in relation to FIG. 1. Any number of payment instruments may be correlated to each payment instrument type 322, 324, 326. For example, as illustrated in FIG. 3C, two different bank accounts 328 have been configured within the bank account type 322. Furthermore, two different credit cards 330 have been configured within the credit card type 324, and three different electronic wallet accounts 332 have been configured within the electronic wallet type 326.

Within each of the payment instrument types 322, 324, and 326, the user is presented with an add new channel option 328*c*, 330*c*, 332*d*. Upon selection of one of the add new channel options 328*c*, 330*c*, 332*d*, in some implementations, the user is presented with a configuration interface to enter information regarding the new payment instrument.

In some implementations, one or more of the payment instruments 328, 330, 332 may be inactive. In some examples, a payment instrument 328, 330, 332 may be inactive until approved (e.g., a verification message is sent via a default communication channel and the user issues a response, a verification transmission is sent to the credit card company or bank to authenticate the payment instrument, etc.), if previously failed (e.g., account overdrawn, suspended, cancelled, etc.) or if designated by other configuration parameters (e.g., disabled by the user, etc.). If a payment instrument 328, 330, 332 is inactive, in some implementations, the user interface presents a visual indication (e.g., "grayed out", different color, highlighted, etc.) to draw the user's attention to a potential problem with the payment instrument. Additionally or alternatively, in some implementations, disabling of a payment instrument may be presented to the user upon selection of the notifications category 306a, as shown in FIG. 3A.

Using the various payment instruments 328, 330, 332 configured by the user, in some implementations, the user may designate different payment preferences and, in some cases, coordinate transaction notification preferences. For example, using a money transfer preferences pane 334, in some implementations, the user may drag and drop payment instruments 328, 330, 332 used for transferring money (e.g., in the case of overdraw). As illustrated, the user has configured bank account #1 328a for transference of funds to bank account #2 328b.

A payment preferences pane 336, in some implementations, allows the user to configure a default payment instrument for conducting transactions. As illustrated, the payment preferences pane designates credit card #1 330a and the mobile phone channel 352b for making payments via the multi-channel communication environment. In some implementations, the user has the option to designate both a primary payment preference and a secondary payment preference (not illustrated). For example, should a first credit card fail (e.g., due to suspension in light of suspected fraudulent activity, etc.), the payment method would revert to the secondary payment preference. Similarly, should the primary communication channel fail (e.g., not accessible, no response from user within a predetermined period of time), in some implementations, the user is provided the opportunity to designate a secondary communication channel. For example, the mobile phone channel 352b may be designated as a confirmation channel for receiving confirmation from the user prior to conducting the transaction. Should the user fail to respond within a predetermined amount of time, for example, the transaction may be aborted (or, if a secondary communication channel is configured, the multi-channel communication environment may attempt to reach the user via the secondary communication channel). In some implementations, the user may have the opportunity to specify purpose-driven payment preferences. For example, the user may designate separate preferences for business transactions versus personal transactions.

Similar to the discussion presented in relation to the payment preferences pane 336, in some implementations, an electronic wallet preferences pane 338 allows the user to configure a default payment instrument for conducting electronic wallet transactions. As illustrated, the electronic wallet preferences pane 338 designates electronic wallet retailer #1 332a, bank account #2 328b, and the mobile phone communication channel 352b for conducting electronic wallet transactions via the multi-channel communication environment. In some implementations, the user has the option to designate both a primary electronic wallet payment preference and a secondary electronic wallet payment preference (not illustrated). In some implementations, the user may have the opportunity to specify purpose-driven electronic wallet payment preferences. For example, the user may designate separate preferences for business transactions versus personal transactions.

In some implementations, the configuration presented within the money transfer preferences pane 334, the payment preferences pane 336, and the electronic wallet preferences pane 338 provides payment instrument preferences to the entities conducting transactions with the user via the multi-channel communication environment. The multi-channel communication environment, in some implementations, additionally or alternatively includes features for individually configuring payment instrument preferences on a per-entity (or per-service) basis.

Figure 3E:
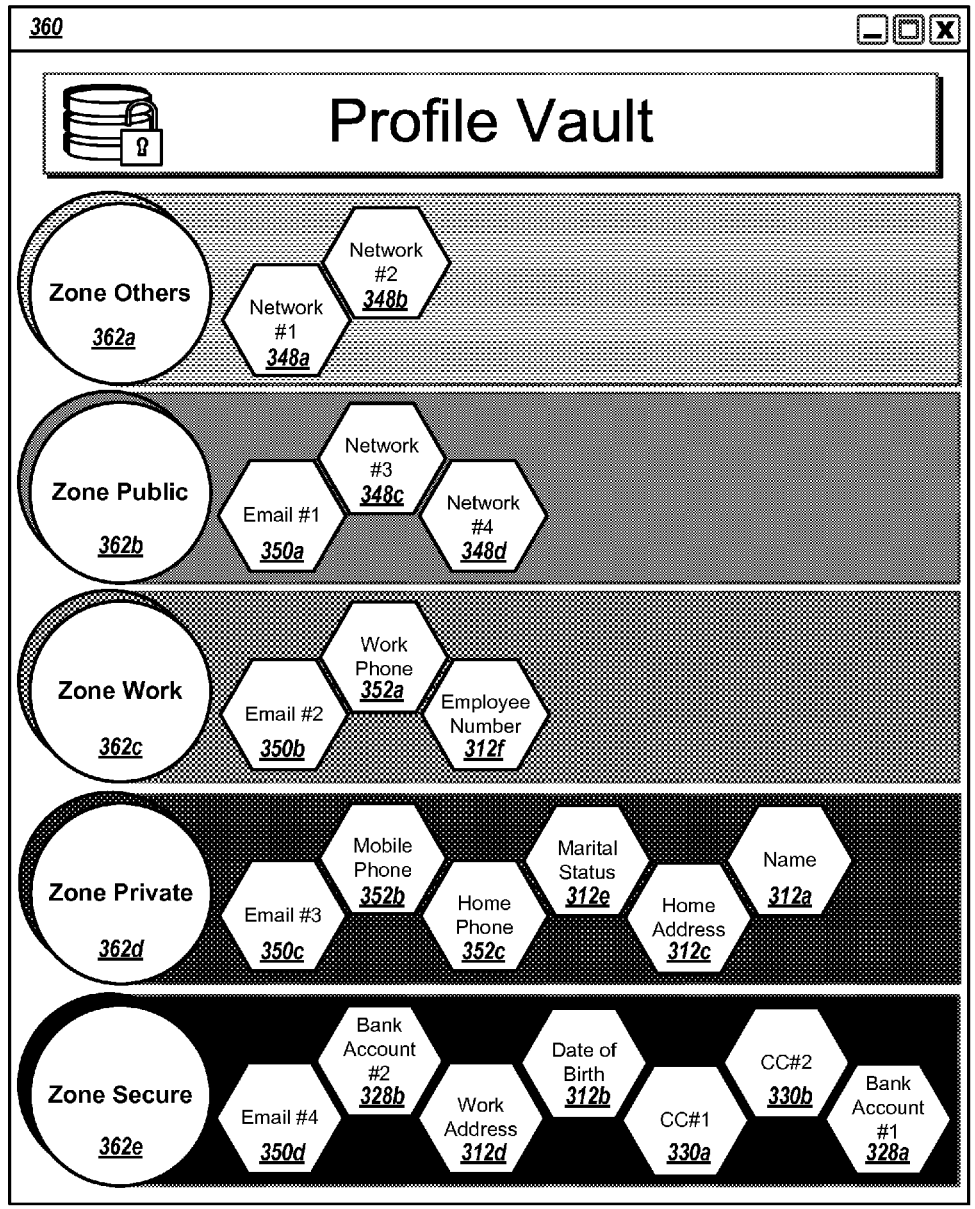

Returning to FIG. 3A, upon selection of the profile vault 304b, the user may be presented with a profile vault user interface 360, as illustrated in FIG. 3E. Turning to FIG. 3E, the profile vault user interface 360 includes a series of privacy zones 362. The user can customize exposure of various personal information via the profile vault user interface 360 by designating separate privacy zones 362 for each portion of the profile information (e.g., each information item). In some implementations, each of the privacy zones 362 are illustrated in a separate color as a visual reminder of security exposure. For example, very sensitive information may be placed in zone secure 362e, rendered red, while publicly exposed information may be placed in zone public 362b, rendered green. A zone work 362c, rendered yellow, may, for example, expose information only to other employees of the user's company.

A zone others 362a in some implementations, contains information items not yet assigned to a privacy zone 362. For example, prior to user manipulation, at least a portion of the various information items may be presented within a default security zone 362. Any information items not designated by the user for a specific security zone 362, for example, may be rendered within the zone others 362a. Information items within zone others 362a, for example may be individually color-coded to indicate a default privacy designation. For example, each of social network #1 348a and social network #2 348b may be rendered green to illustrate that the social network items 348 default to zone public 362b.

In some implementations, the security zone designation is used by the multi-channel communication environment in determining a method for storing the information item. For example, the multi-channel communication environment may protect information items designated within zone secure 362e such that each information item (350d, 328b, 312d, 312b, 330a, 330b, and 328a) is stored in an encrypted or otherwise protected state. Information items within zone public 362b (350a, 348c, and 348d), on the other hand, may be stored as plain text. Other security measures may be applied based in part upon the designated security zone 362.

In some implementations, the user may be incapable of modifying the security designation of at least a portion of the information items. For example, the credit cards 330a and 330b and the bank accounts 328a and 328b are illustrated within the zone secure 362e. In some implementations, payment instrument information items are locked to zone secure 362e.

The requesting entity (e.g., originating entity) of a particular information item, in some implementations, may designate an appropriate privacy zone 362 for the information item. In some implementations, the requesting entity may designate whether the information item is to be locked to that privacy zone 362. For example, employee number 312f may be designated for zone work 362c by the employer.

In some implementations, upon configuring a new information item, such as profile information, a communication channel, or a payment instrument, the user is prompted to select a privacy setting for the information item. For example, using the identification hub 310 of FIG. 3B, the transaction hub 320 of FIG. 3C, or the communication hub 340 of FIG. 3D, the user may configure and specify the privacy setting for a new information item. The user, for example, may choose to allow the information item to be shared with one or more additional organizations. In some implementations, the user is provided the opportunity to identify whether information is to be shared freely or if compensation is required for sharing the information. For example, the user may require a form of compensation in exchange for allowing a third party organization to access the information entered within the new information item. The compensation, in some examples, may include remuneration (e.g., into a user-configured bank or eWallet account, etc.) or other item with monetary value such as a gift certificate or coupon, and/or an organization-specific compensation such as a membership upgrade or membership points, In some implementations, the user may be prompted prior to allowing information to be shared with another organization.

Figure 3F:
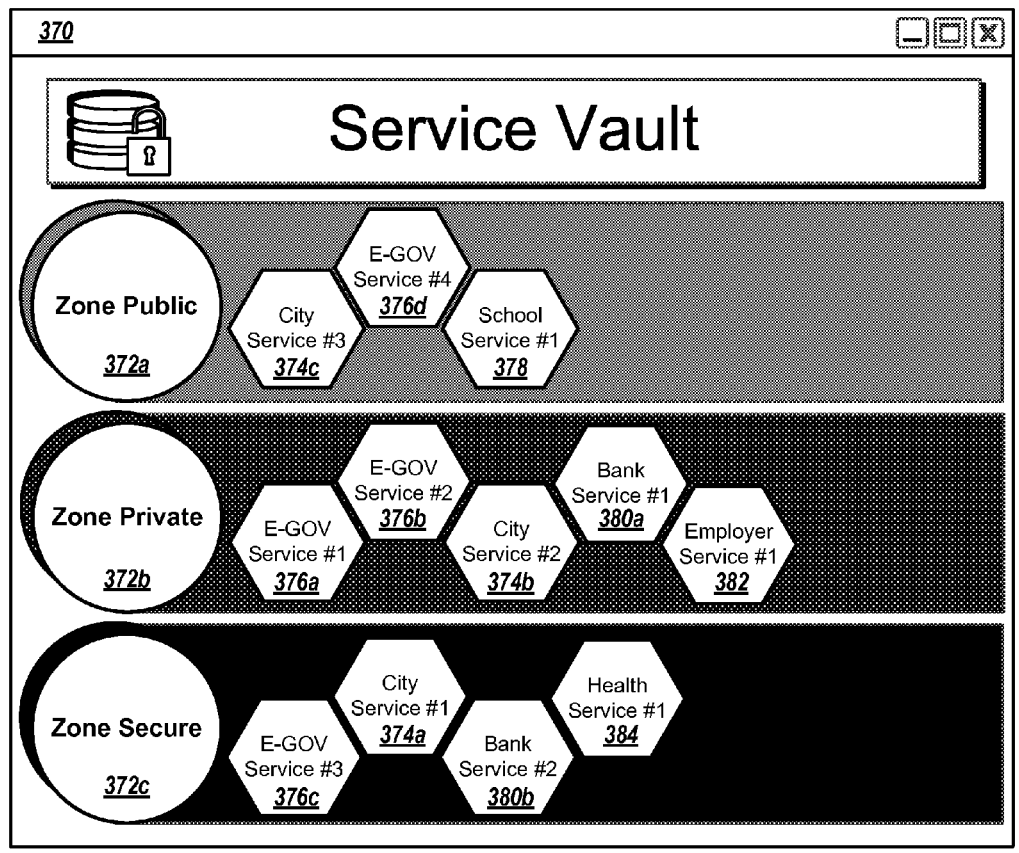

Returning to FIG. 3A, upon selection of the service vault 304d, the user may be presented with a service vault user interface 370, as illustrated in FIG. 3F. Turning to FIG. 3F, the service vault user interface 370 includes a series of protection zones 372. Within each of the protection zones 372, a number of services 374, 376, 378, 380, 382, and 384 are displayed. Each of the services 374, 376, 378, 380, 382, and 384 is associated with a particular entity. For example, the city services 374 are associated with a city government entity, the E-GOV services 376 are associated with a government entity (e.g., municipal, state, district, province, etc.), the school service 378 is associated with a school (e.g., public school district, individual school, government service regarding closures of schools in a particular district, municipality, or state, etc.), the bank services 380 are associated with a banking institution, the employer service 382 is associated with a corporation or other employer, and the health service 384 is associated with a health services entity (e.g., insurance company, doctor's office, hospital, or other health organization). The entities associated with the various services 374, 376, 378, 380, 382, and 384, for example, are affiliated with the multi-channel communication environment to distribute notifications and other services to users via user-configured communication channels.

In some implementations, the user has no control over customization of the protection zones 372. For example, each of the services 374, 376, 378, 380, 382, and 384 may be allocated to a particular protection zone 372 based at least in part upon the privacy settings of the various information items accessed by the particular service 374, 376, 378, 380, 382, or 384 (e.g., the information items 312, 328, 330, 348, 350, 352 designated to the various privacy zones 362 as described in relation to FIG. 3E). In some implementations, the entity may determine a particular protection zone 372 for a particular service. For example, the financial institution entity may designate a bank service #2 380b for high protection, allocating the bank service #2 380b to a zone secure 372c.

In some implementations, each of the protection zones 372 are illustrated in a separate color as a visual indicator of security exposure. For example, very sensitive information may be placed in zone secure 372c, rendered red, while publicly exposed information may be placed in zone public 372a, rendered green. A zone private 372b, rendered yellow, may, for example, include information that is partially protected or protected in a less robust manner (e.g., secured transmission channel, but not encrypted information, etc.).

In some implementations, each of the protection zones 372 is associated with a set of allowed behaviors by the associated services. Within zone secure 372c, for example, information may be relayed by the services 376c, 374a, 380b, and 384, while the service itself is not capable of copying information. The zone secure 372c, for example, may identify services 376c, 374a, 380b, and 384 involved in financial transaction. The services 376c, 374a, 380b, and 384 associated with the zone secure 372c, for example, may use protected transmission paths within the multi-channel communication environment. In some implementations, the multi-channel communication environment maintains a portion of information relayed via the services 376c, 374a, 380b, and 384 in a protected manner (e.g., within a secure storage region). For example, the multi-channel communication environment may maintain a transaction history for each service or on behalf of at least a portion of the users utilizing the protection zone secure 372c services 376c, 374a, 380b, and 384.

Turning to protection zone private 372b, private protection, for example, may relate to the services 376a, 376b, 374b, 380a, and 382 each having the ability to maintain a portion of the information contained within associated information items. For example, a service may be able to maintain a home address (e.g., home address 312c as illustrated in zone secure 362e of FIG. 3E) but not a secured email address (e.g., email #4 350d as illustrated in zone secure 362e of FIG. 3E). Additionally, in some implementations, services 376a, 376b, 374b, 380a, and 382 identified within protection zone private 372b may use protected transmission paths within the multi-channel communication environment.

Turning to protection zone public 372a, public protection, for example, may signify that the services 374c, 376d, and 378 each have the ability to maintain any and all information contained within the associated information items. Additionally, the services 374c, 376d, and 378 may relay information, in some implementations, via unprotected communication channels.

While reviewing the service vault user interface 370, in some implementations, the user can suspend or cancel a particular service. For example, by selecting a particular service 374, 376, 378, 380, 382, or 384, the user may be presented with a dialog box or other user interface screen with one or more controls associated with the performance of the selected service 374, 376, 378, 380, 382, or 384. In some implementations, upon selection of a particular service 374, 376, 378, 380, 382, or 384, the user may review which information items 312, 328, 330, 348, 350, 352 are used by the particular service 374, 376, 378, 380, 382, or 384.

FIG. 4 illustrates an example entity-specific user interface 400 for subscription management in a multi-channel context aware communication environment. The user interface 400 is configured to collect information regarding a bank customer. The user interface 400, for example, may be presented to the user through the bank website or a banking mobile application. Various input fields of the user interface 400 gather information for configuring communication channels for notifications available to the user in relation to services provided by the bank. Upon configuring the communication channels via the user interface 400, for example, the information entered by the user into the user interface 400 may be provided to the multi-channel communication environment to establish or update a user profile.

The user interface 400 includes a personal information section 402 for collecting personal information regarding the user (e.g., for establishing a user profile), a communication preferences section 404 for collecting communication channel information regarding email addresses, social network accounts, telephone numbers, and mobile phone applications associated with the user (e.g., for identifying communication channels for the communication of notifications) and a notification services section 406 for collecting notification preferences (e.g., subscriptions to one or more services, with affiliated communication channels).

Beginning with the personal information section 404, the information collected may correlate to the identification hub user interface 310 of FIG. 3B. The bank, in this circumstance, may control privacy settings for the various information collected using the personal information section 404 (e.g., correlating to the privacy zones 362 of FIG. 3E). A portion of the services configured via the notification services section 406, in some implementations, use a portion of the personal information entered into the personal information section.

The communication preferences section 404 is configured to collect information regarding a number of communication channels 408 associated with the user, such as email channels 408a, text messaging channels 408b, social networking channels 408c and 408d, telephone channels 408e, and mobile application channels 408f. Additionally, the user is invited to select a preferred (default) channel 410. The bank, in this circumstance, may control privacy settings for the various information collected using the communication preferences section 404 (e.g., correlating to the privacy zones 362 of FIG. 3E).

The communication channels 408, in some implementations, are identified by the user when configuring notification services via the notification services section 406. Notification services are grouped by product type 412 such as, in some examples, a car loan type 412a, a mortgage type 412b, a bank account type 412c, a home equity credit line type 412d, and a credit card type 412e. The product types 412 map to various products the user has acquired from the bank.

As illustrated, the bank account type 412c has been selected, and a number of notification services 414 are presented to the user, including a fraud attempt detection notification, a minimum amount alert notification, a 10% credit left notification, a check emission counter notification, and a house loan notification. Each notification is associated with an account number 416, a start date 418, and required communication channels 420.

As illustrated, the user has subscribed to both the fraud attempt detection notification and the check emission counter notification. Each of these notification services is associated with required communication channels including a text messaging channel and an email channel. Upon selection of one of the services 414, if the user has configured more than one of a particular type of communication channel 408 (e.g., two or more email addresses 408a, two or more phone numbers 408b for text messaging, etc.), the user may be prompted to select a preferred communication channel. Configuration of the notification services, for example, may correlate to the notification preferences pane 354 of the identification hub user interface 310 described in relation to FIG. 3D.

Figure 5:
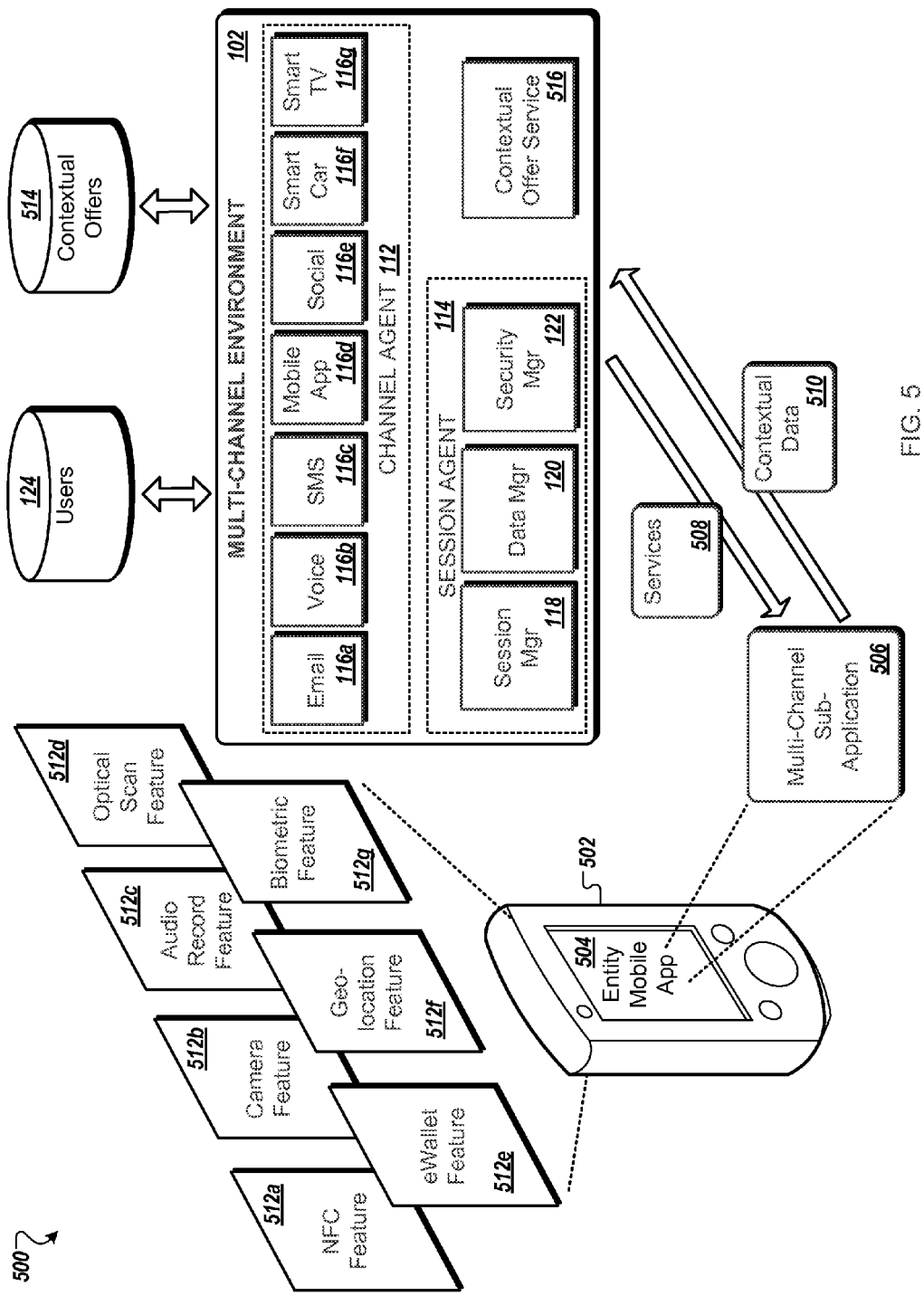
FIG. 5 is a block diagram of an example system for managing a multi-channel context aware interface within an entity mobile application.

FIG. 5 is a block diagram of an example system 500 for managing a multi-channel context aware interface within an entity software application. Rather than providing a direct interface for individuals (e.g., customers, members, employees, etc.) via the multi-channel communication environment 102, in some implementations, the multi-channel communication environment 102 provides one or more entities with a back-end processing solution for managing multi-channel communications on behalf of the entity. For example, a user interface for establishing and managing configuration options may be customized for entity-specific use (e.g., such as the user interface 400 described in relation to FIG. 4). Additionally, in some implementations, the multi-channel communication environment 102 provides a multi-channel sub-application 506 for inclusion within an entity software application 504 (e.g., software application configured for use on a computing device). Through the multi-channel sub-application 506, services 508 may be provided to the user on a user's mobile computing device 502 (e.g., hand-held computing device, smart phone, tablet computer, notebook computer, laptop computer, smart car, or other portable computing device) via the multi-channel communication environment 102. In other implementations, rather than a mobile (portable) computing device, the entity application may be installed upon a stationary computing device, such as a desktop computer or smart TV. The multi-channel sub-application 506 may provide back-end processing for configuring and managing multi-channel communications for a user with respect to various services 508 offered by the entity.

In some implementations, the multi-channel sub-application 506 derives contextual data 510 from one or more peripheral features 512 of the mobile device 502. The contextual data 510, in some examples, may include transaction data derived from an e-Wallet peripheral feature 512e, position information derived from a geolocation peripheral feature 512f, or user identification information derived from a biometric feature 512g. In other examples, the contextual data 510 may include transmission (and/or transaction) information derived from a near-field communication (NFC) peripheral feature 512a, image data derived from a camera feature 512b or an optical scan feature 512d, scan data derived from the optical scan feature 512d (e.g., QR code contents, product identifier from bar code scan, etc.), or audio data derived from an audio recording peripheral feature 512c.

In some implementations, the multi-channel communication environment 102 saves a portion of the contextual data 510, for example within the user profile data store 124. For example, contextual data 510 related to transactions may be collected by the entity for statistical or record-keeping purposes.

The multi-channel communication environment 102, in some implementations, matches a portion of the contextual data 510 to one or more contextual events 514. The contextual events 514, for example, may relate to products, services, or events associated with the entity. In another example, the contextual events 514 may relate to products, services, or events associated with affiliates of the entity (e.g., other entities registered with the multi-channel communication environment 102 or separate entities). The data manager 120 of the session agent 114, for example, may match one or more contextual events 514 with the contextual data 510 received by the session manager 118 during a session established by the communication of a particular service 508 to the user via the multi-channel sub-application 506. In some implementations, contextual data 510 is received outside of a notification session. For example, while the multi-channel sub-application 506 is active upon the mobile device 502, contextual data 510 may be collected and delivered (e.g., periodically, upon occurrence of an event, etc.) to the multi-channel communication environment 102. This contextual data 510, for example, may include geo-location information. A contextual event service 516 of the multi-channel communication environment 102, in some implementations, may serve one or more contextual events 514 in relation to the polled contextual data 510.

The multi-channel communication environment 102 may serve one or more contextual events 514 to the user responsive to a contextual match between the contextual data 510 and one or more contextual events 514. For example, a particular contextual event 514 may be provided to the user within the entity mobile application 504. In another example, the particular contextual event 514 may be provided to the user via a different communication channel 116 registered to the user, such as the email channel 116a, the SMS channel 116c, or the social network channel 116e. The user, in some implementations, may be provided configuration options related to how contextual events are received. For example, the user may designate one or more channels for receipt of contextual events related to affiliates of the entity, and one or more (optionally) different channels for receipt of contextual events related to the entity.

In a particular example, contextual data 510 received from the mobile computing device 502 via the multi-channel sub-application 506 may identify a user location within a predetermined distance of a brick and mortar store owned by a coffee shop entity. Based upon user data in the user profile data store 124, the multi-channel communication environment 102 may additionally identify that the user has made one or more transactions with the entity for a particular type of latte. The multi-channel communication environment 102 may match the combination of the geolocation information and the transaction information with a contextual event (e.g., marketing offer) for a discount on a latte. The contextual event, for example, may identify to the user information regarding the nearest brick and mortar location. The multi-channel sub-application 506 may push the contextual event to the user vial the entity mobile application 504.

In another example, contextual data 510 received from computing devices 502 of multiple team members (e.g., via the multi-channel sub-application 506 or another reference mechanism) may identify the closest team member or team members to a problem which needs on-site attention. For example, a closest team member of an Information Technology (IT) service company to an out of order printer may be issued a message to proceed, if possible, to the location of the printer to resolve the issue. One of more team members, upon receipt of the message, may acknowledge and confirm availability via the multi-channel environment 102 (e.g., via one of the communication channels 112).

In some implementations, steps of a workflow may be adjusted based upon available contextual data 510. For example, upon receipt by the multi-channel communication environment 102 of a fraud alert from a financial organization communication source, the multi-channel communication environment 102 may review archived contextual data 510 and/or request current contextual data 510 including a geolocation corresponding to the user device. Should the multi-channel communication environment 102 determine that the user is located within a threshold distance of a physical location affiliated with the financial organization (e.g., branch office, ATM machine, etc.), the workflow may branch to a step requesting the user to proceed to the nearest physical location to authenticate a recent transaction.

Figure 6:
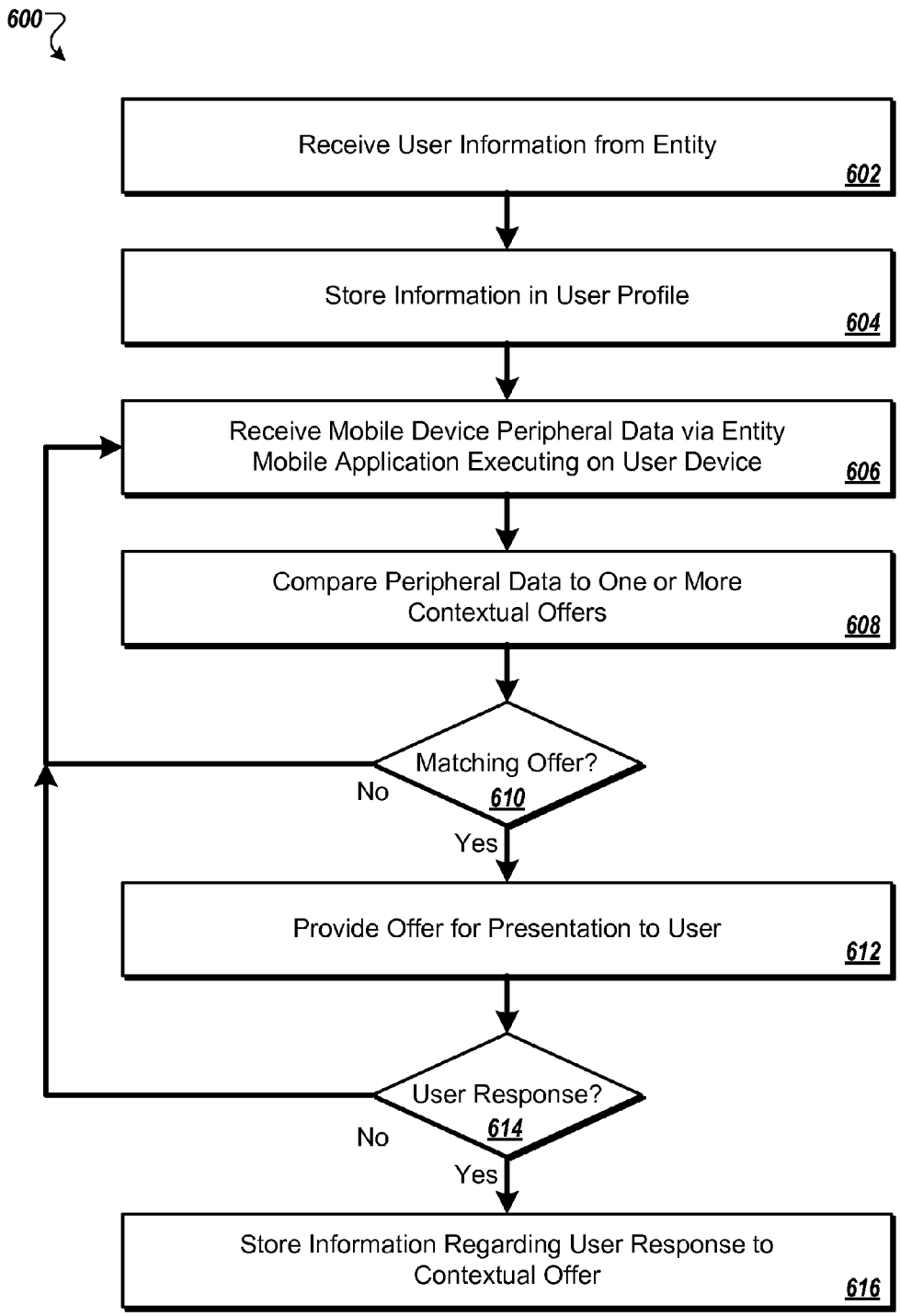
FIG. 6 is a flow chart of an example method for gathering data regarding usage of peripheral features of a mobile device and providing contextual events based in part upon the data.

FIG. 6 is a flow chart of an example method 600 for gathering data regarding usage of peripheral features of a mobile device and providing contextual events based in part upon the data. The method 600, for example, may be performed by the session agent 114 as described in relation to FIG. 1 and FIG. 5.

In some implementations, the method 600 begins with receiving user information from an entity (602). The entity, for example, is registered to provide notification services to users through a multi-channel communication environment, such as the multi-channel communication environment 102 described in relation to FIG. 1 and FIG. 5. The user information provided to the entity by a user (e.g., customer/client/employee of the entity), for example, may include personal information such as name, address, telephone number, birth date, and email address. In some implementations, at least a portion of the information is received via an entity mobile application. For example, the entity mobile application may include a multi-channel sub-application configured to support communications between a user at a mobile computing device and a multi-channel communication environment. In some implementations, at least a portion of the information is received via an entity web site. For example, the entity web site may include a portal for configuring information in the multi-channel communication environment.

In some implementations, the user information is stored in a user profile (604). The user profile, for example, may include a collection of information regarding the user and notification services the user has registered to receive. In some implementations, the user information is stored in the user profile data store 124 described in relation to FIG. 1 and FIG. 5.

In some implementations, user device peripheral data is received via an entity software application (606). In some implementations, the peripheral data (e.g., contextual data 510 as described in relation to FIG. 5) may be polled prior to service of an event to the user of the user device. For example, geolocation information may be polled prior to service of an event, such that one or more contextual events, contextual features, and/or workflow steps may be added to the event. In some implementations, the peripheral data may be collected upon service of information associated with an event to the user. The peripheral data, for example, may be included within a response from the user to information issued by the multi-channel communication environment on behalf of the entity. The peripheral data, in some implementations, may be provided by a multi-channel sub-application of an entity software application, such as the multi-channel sub-application 506 described in relation to FIG. 5. For example, upon an event (e.g., launching of the entity software application, using an eWallet account via the entity software application, etc.), the multi-channel sub-application may provide peripheral data to the multi-channel communication environment. In another example, while the multi-channel sub-application is active, the multi-channel sub-application may collect peripheral data and provide it (e.g., on a periodic and/or event-driven basis) to the multi-channel communication environment.

The peripheral data, in some implementations, is stored by the multi-channel communication environment. For example, a portion of the peripheral data may be collected for managing event service and/or transaction history by the entity, and/or for establishing behavior patterns of the user. The peripheral data, for example, may be stored within the user profile data store 124, as described in relation to FIG. 5.

In some implementations, the peripheral data is compared to one or more contextual events (608). In some implementations, the contextual event service 516, described in relation to FIG. 5, compares the peripheral data to one or more contextual events 514 associated with the entity or an affiliate of the entity. The contextual events, in some implementations, may rely on geolocation data, transaction data, product data, user demographic information, and other information collected or received (e.g., via peripheral data) regarding the user. The contextual event service 516, for example, may combine the peripheral data with user demographic data, historic peripheral data, or other information related to the user in identifying one or more contextual events.

If no matching contextual events are identified (610), in some implementations, the method 600 returns to receiving user device peripheral data (606). If, instead, at least one matching contextual event has been identified (610), in some implementations, information associated with the contextual event(s) is provided for presentation to the user (612). One or more of the contextual events, in some implementations, are presented to the user via the entity software application executing upon the user device. The contextual event(s), for example, may be presented to the user in relation to a notification service provided to the user. In some implementations, the contextual event(s) are provided for presentation upon a separate communication channel configured by the user. For example, contextual events may be served to a user's SMS phone number, email address, or social networking account. If the user is presently driving near a brick and mortar location of the entity (or entity affiliate), for example, the user may receive the contextual event via a smart car communication channel. If the user is presently watching a program, in another example, the contextual event may be displayed to the user as a banner advertisement scrolling along the bottom of a smart TV.

If the user fails to respond to one of the contextual events (614), in some implementations, the method 600 returns to receiving mobile device peripheral data (606). Otherwise, if the user responds to the contextual event (614), information regarding the user's response to the contextual event, in some implementations, is stored (616). For example, a user may be provided the opportunity to accept or decline a contextual event (e.g., via controls provided by the entity software application, etc.). In another example, a user may respond by redeeming a contextual event or carrying out instructions presented by the contextual event. For example, the user may conduct a transaction related to the contextual event or visit a physical location identified within the contextual event. In some implementations, identifying a user response includes identifying a geolocation or transaction information provided by the multi-channel sub-application in subsequent contextual data. For example, based upon geolocation information derived from the user device, the multi-channel sub-application may identify that the user is within the vicinity of the physical location. In another example, based upon eWallet information or NFC information derived from the user device, the multi-channel sub-application may identify that the user conducted a transaction related to the contextual event.

In some implementations, the user may respond by redeeming a contextual event or responding to the contextual event via the multi-channel communication environment. For example, using a preconfigured transaction service, the user may conduct a transaction related to the contextual event. The multi-channel communication environment may match the transaction information of the transaction conducted using the preconfigured transaction service with the contextual event. The transaction service, for example, may be configured using the payment preferences pane 336 or electronic wallet preferences pane 338 as described in relation to FIG. 3C.

In some implementations, the information regarding the user's response (or reaction) to the contextual event is stored within the user profile data store 124, as described in relation to FIG. 1.

Figure 7A:
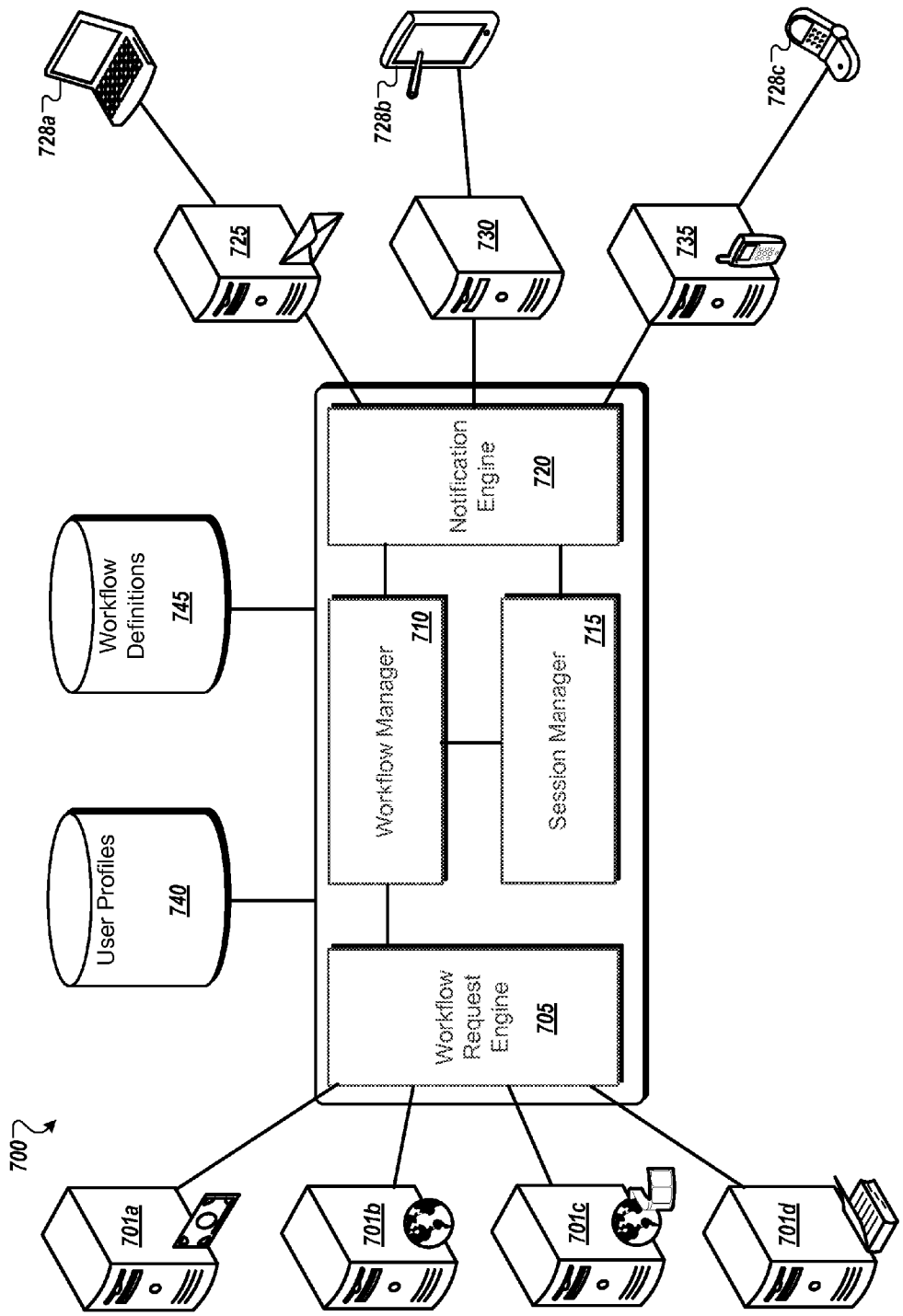
FIGS. 7A and 7B are block diagrams of example systems for bi-directional communication across multiple communication channels for a workflow.
Figure 7B:
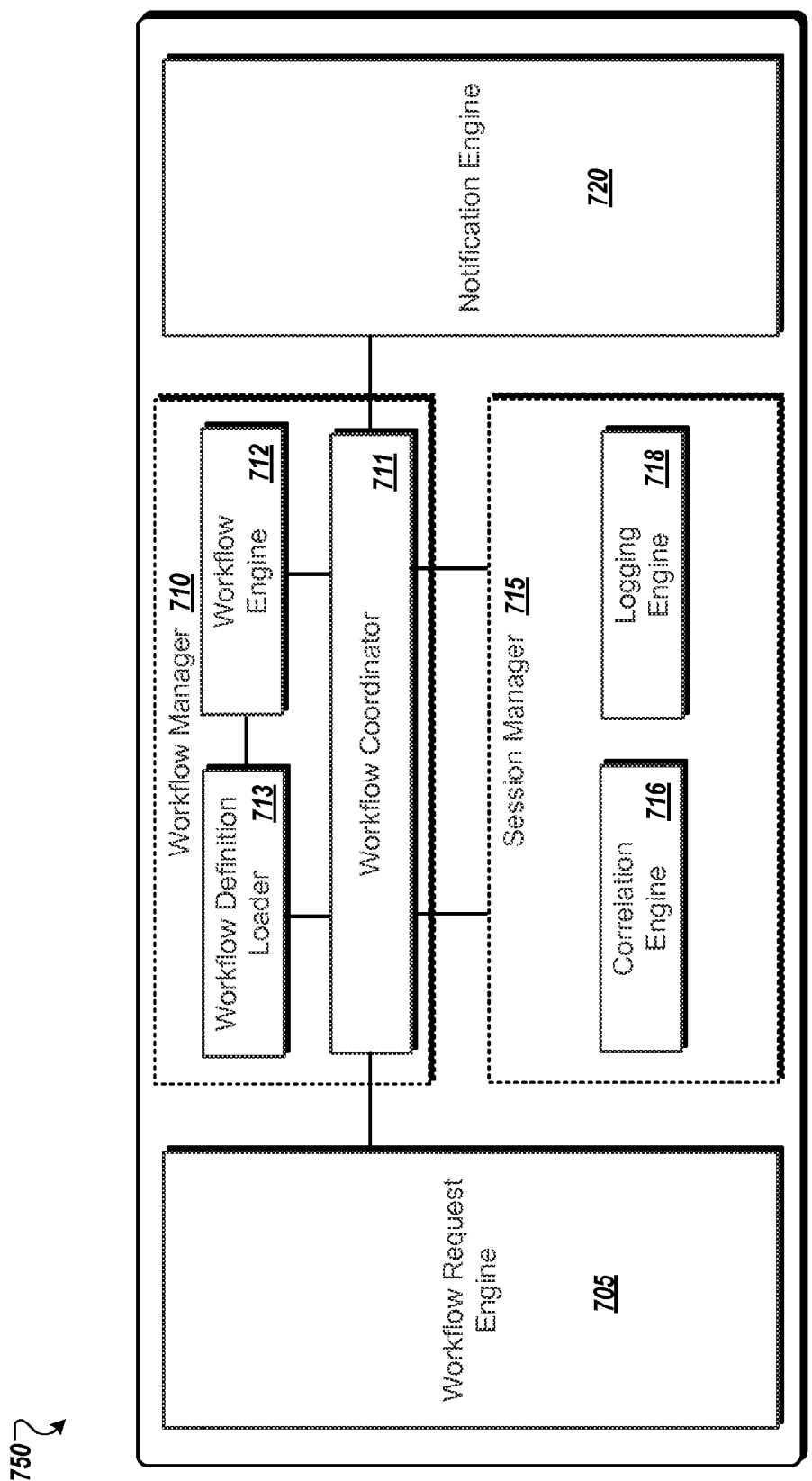

FIGS. 7A and 7B are block diagrams of example systems for bi-directional communication across multiple communication channels for a workflow. Referring now to FIG. 7A, a system 700 (also referred to herein as a "workflow platform") for communicating bi-directionally across multiple communication channels for a workflow is shown and described. The system 700 includes at least one processor and at least one memory. The at least one memory is configured to store instructions that, when executed, implement a workflow request engine 705, a workflow manager 710, a session manager 715, and a notification engine 720. The system 700 may communicate with external systems 701 to identify a workflow for execution and/or to create an instance of the workflow (also referred to herein as "workflow instance"). The system 700 may communicate with a user profile database 740 to obtain information about users. The system 700 may communicate with workflow definition file stores 745 to obtain information for creating instances of workflows for execution. The system 700 may communicate with client devices 728a, 728b, 728c (collectively 728) via entities 725, 730, 735 used on communication channels, while executing the workflow.

In operation, the workflow request engine 705 may receive a message from an external system 701. The workflow request engine 705 may transmit the message to the workflow manager 710. The workflow manager 710 may identify a user. In some implementations, the workflow manager 710 may parse the message to obtain an identification of a user. In some implementations, the workflow manager 710 may retrieve information about the user. For example, the workflow manager 710 may communicate with a user profile database 740 to retrieve the user's profile. In some implementations, a user profile may include the user's name and information about communication channels to which the user has consented (e.g., e-mail, short message service or "SMS," mobile application, mobile site, interactive voice response/IVR, Voice over Internet Protocol/VoIP, Wi-Fi™ tagging, radio frequency identification/RFID mediums). The user profile may include indicia of the communication channels to which the user has consented (e.g., e-mail address; mobile telephone number; uniform resource locator (URL); internet protocol (IP) address of a computing device; identification number of a computing device; identifier associated with single sign-on (SSO); identifier associated with an identification scheme such as OpenID, Facebook® ID, Twitter™ ID, or Google® ID).

The workflow manager 710 may identify a workflow for execution based on the message. In some implementations, the message from the external system 701 may identify the workflow. For example, the message may include a request to execute a workflow with a specified identification number. In some implementations, the workflow manager 710 may analyze the message to select the workflow. For example, the message may identify an event. The workflow manager 710 may select the workflow according to the event.

In some implementations, the workflow manager 710 may obtain one or more workflow definition files associated with the workflow. The workflow manager 710 may obtain the files from a workflow definition file store 745 (e.g., HTTP servers, REST servers, file systems, FTP servers, web-based distributed authoring and versioning (WebDAV) servers).

In some implementations, the workflow manager 710 may analyze the workflow against the user profile to determine if a workflow instance should be created for execution. In some implementations, the workflow manager 710 may analyze the first step of the workflow. The first step may require communication with a user through a specified communication channel. The workflow manager 710 may determine, based on the user profile, that the user has not consented to communication on the specified channel (e.g., the user profile does not include a mobile telephone number). The workflow manager 710 may determine the workflow cannot be performed. In some implementations, the workflow manager 710 may send a message indicating the workflow cannot be performed to the workflow request engine 705. The workflow request engine may send the message to the external system 701 that requested the workflow.

In some implementations, the workflow manager 710 may analyze each step in the workflow. The workflow manager 710 may determine one or more steps that require communication on specified channels. The workflow manager 710 may compare the specified channels against the communication channels in the user profile. If the user profile does not include one or more of the specified communication channels, the workflow manager 710 may determine the workflow cannot be performed. In some implementations, the workflow manager 710 may send a message indicating the workflow cannot be performed to the workflow request engine 705. The workflow request engine may send the message to the external system 701 that requested the workflow.

In some implementations, the user profile may include all the communication channels specified by the workflow steps. The workflow manager 710 may create the workflow instance. The workflow instance may include an identifier, such as an identification number. In some implementations, the workflow manager 710 may use parameters from the message from the external system 701 when creating the instance. Exemplary parameters include the periods of time for each step of the workflow in which the user must respond to communication, the addresses that shall receive the responses, and/or the requirement for a read-receipt regarding a communication.

In some implementations, the workflow manager 710 may send the identifier and the user profile to the session manager 715. The session manager 715 may correlate the workflow instance with the indicia of the communication channels to which the user has consented. For example, the session manager 715 may correlate the identification number of a workflow instance with a user's e-mail address, mobile telephone number, mobile devices, or any combination thereof The session manager 715 may create a log for the workflow instance. In some implementations, the session manager 715 may associated the workflow instance with a predetermined period of time before the workflow instance expires.

The workflow manager 710 may execute the workflow instance. In some implementations, a step of the workflow instance may require communication with the user. In some implementations, the step may specify the communication channel to be used. For example, the step may include sending an SMS message to the user's mobile telephone number. In some implementations, the step may specify alternative communication channels that may be used. In some implementations, the step may prioritize one communication channel over another. For example, the step may include sending an SMS message to the user's mobile telephone number if the user's mobile telephone number is provided in the user profile. If the user's mobile telephone number is not available, the step may alternatively include sending an e-mail message to the user's e-mail address.

The workflow manager 710 may send an instruction to the notification engine 720. The instruction may include the message to send to the user, based on the step in the workflow instance. The instruction may include the communication channel through which the message shall be sent. The instruction may include the indicia associated with the user for the communication channel. The notification engine 720 may process the instruction. The notification engine 720 may communicate with a third-party service (e.g., electronic mail server 725, SMS gateway server 730, mobile application server 735) to send the user the message through the specified communication channel. The user may access the message on a client device 728.

In some implementations, the workflow manager 710 may send the instruction to the session manager 715. The session manager 715 may log an entry for the workflow instance corresponding to the instruction.

In some implementations, a step of the workflow instance may require receipt of communication from the user. In some implementations, the notification engine 720 may receive a message from a third-party service, such as an electronic mail server 725, SMS gateway server 730, or mobile application server 735, although servers associated with any of the communication channels described herein may also be used. The notification engine 720 may send the message to the workflow manager 710 and/or the session manager 715. The session manager 715 may parse the message to determine the indicia of the communication channel, corresponding to the source of the message. The session manager 715 may identify one or more workflow instances correlated with the indicia. The session manager 715 may send the one or more workflow instance identifiers and the received message to the workflow manager 710. The session manager 715 may log an entry for the workflow instance corresponding to the communication received from the user.

The workflow manager 710 may process the received message according to the step in the workflow instance. The workflow manager 710 may continue to execute the steps in the workflow. In some implementations, when the session manager 715 completes execution of the workflow instance, the session manager 715 may determine one or more results of the instance. The session manager 715 may instruct the workflow request system 705 to send the result(s) to the external system 701 that requested the workflow. In some implementations, the session manager 715 may store the identifier of the workflow instance and/or result(s) of the executed instance for future retrieval for external systems 701.

In some implementations, one or more engines of the system 700 may execute on an application server. All the engines may execute on the same server. In some implementations, some of the engines execute on one server, while other engines execute on different servers. In some implementations, more than one server may execute any engine of the system 700. In some implementations, the engines may execute on one or more Java application servers. In some implementations, the engines may execute on any version of the WebSphere Application Servers, as manufactured by International Business Machines of Armonk, N.Y.

In some implementations, any of the engines described herein may be implemented as Java classes. In some implementations, the workflow manager 710 creates additional engines needed for a workflow instance upon creation of the instance itself In some implementations, the workflow manager 710 may include a Drools 5 product, manufactured by Apache.

In some implementations, the session manager 715 may store information about correlations between workflow instances and indicia of communication channels in a relational database of a relational database management system (RDBMS). In some implementations, the session manager 715 may store logs of workflow instances in a relational database. The session manager 715 may interact with a persistence layer to store the information. In some implementations, the session manager 715 may communicate with the persistence layer via a Java Persistence API (JPA), such as Hibernate. The persistence layer may communication with one or more relational databases via Java DataBase Connectivity (JDBC). Exemplary relational databases may be DB2 V9, provided by International Business Machines of Armonk, N.Y.

In some implementations, the notification engine 720 may include a message queuing system. The message queuing system may include send queues (e.g., prioritized send queues) that store messages to be sent to users. The message queuing system may include the receive queues that store messages received from users. In some implementations, the message queuing system may be WebSphere MQ, manufactured by International Business Machines of Armonk, N.Y. In some implementations, the message queuing system may be SIBus (e.g., a default message queuing system used by the WebSphere Application Server.

In some implementations, the system 700 may communicate with users who form at least part of a mobile workforce. In some implementations, the system 700 may connect with computing devices via Wi-Fi™ or radio frequency identification (RFID). In some implementations, the system 700 may be leveraged for business-to-business communications and/or transactions.

In some implementations, external systems 701 may be legacy systems, content management system (CMS), customer relationship management (CRM) systems, supply chain management (SCM) systems, enterprise resource planning (ERP) systems, portals, enterprise systems, or any other system as would be appreciated by one of ordinary skill in the art.

In some implementations, the messages that external systems 701 send to the system 700 may be in any format. For example, a message may be in a comma-separated values (CSV) format. In another example, a message may have an American Standard Code for Information Interchange (ASCII) format. In another example, a message may have an Extensible Markup Language (XML) format.

In some implementations, an external system 701 may interact with the system using the hypertext transfer protocol (HTTP). In some implementations, a message an external system 701 sends to the system 700 requesting execution of a workflow may conform to the Simple Object Access Protocol (SOAP). In some implementations, a message an external system 701 sends to the system 700 requesting the result(s) of an executed workflow may conform to the Representational State Transfer (REST) protocol.

In some implementations, the workflow request engine 705 may interact with external systems 701 through a workflow integration layer (not shown), such as an enterprise workflow integration layer. The external systems 700 may interface with the workflow integration layer via web services, or other non-intrusive systems. In some implementations, an external system 701 may be an external client enterprise system. The external client enterprise system may send a message with an event to the workflow integration layer via invoking a service associated with the workflow integration layer, by way of example. The workflow integration layer may send the message to the workflow request engine 705. In some implementations, the workflow request engine 705 may receive a result of an executed workflow instance and/or information in a communication from a user received from a client device 728. The workflow request engine 705 may invoke a service associated with the workflow integration layer to transmit the information to the external system 701.

Referring now to FIG. 7B, the system 750 for communicating bi-directionally across multiple communication channels for a workflow is shown and described in further detail. The system 200 includes at least one processor and at least one memory. The at least one memory is configured to store instructions that, when executed, implement a workflow manager 710 with a workflow coordinator 711, workflow engine 712, and/or workflow definition loader 713. The at least one memory is configured to store instructions that, when executed, implement a session manager 715 with a correlation engine 716, and/or logging engine 718.

In some implementations, the workflow coordinator 711 may manage communication between the other engines. For example, the workflow coordinator 711 may receive a communication from a user from the notification engine 720. The workflow coordinator 711 may send the communication to the session manager 715 to correlate to a workflow instance. The session manager 715 may send the instance's identifier to the workflow coordinator 711. The workflow coordinator 711 may send the identifier and the communication to the workflow manager 710. In another example, as the workflow manager 710 executes a workflow instance, the workflow manager 710 may send the instance's identifier and information about communications sent to users to the workflow coordinator 711. The workflow coordinator 711 may send the identifier and information to the session manager 715 for recordation in the instance's log.

In operation, the workflow definition loader 713 may communicate with the workflow definition file store(s) 740 to obtain workflow definition files. After receiving the identifier of a workflow from the workflow coordinator 711, the workflow definition loader 713 may retrieve from memory one or more files identifying the location(s) of workflow definition files for the workflow. In some implementations, the loader 713 may retrieve an XML file with the identifier of the workflow, the URLs of the file store 745 with the workflow definition files, and the URLs of the files. Using the URLs, the loader 713 may request the files from a file store 745. The loader 713 may load the files into the workflow engine 712 for execution.

In some implementations, the workflow definition files may be Drools flow and rule files, as developed by Red Hat, Inc. of Raleigh, N.C. In some implementations, the workflow definition files may describe a workflow using business process modeling notation (BPMN). In some implementations, the files may be created using any business rule management system (BRMS) as would be appreciated by one of ordinary skill in the art.

In some implementations, the loader 713 or the workflow engine 712 may store one or results of executed workflow instances in the workflow definition file stores 745. The loader or engine 712 may send the instance's identifier and result(s) to the file store 745. In some implementations, the result(s) may be stored with the workflow definition files.

In operation, the workflow engine 712 may execute an instance of a workflow. In some implementations, the engine 712 may execute multiple workflow instances. One or more of the workflow instances may be created and executed based on the same workflow, e.g., the workflow engine 712 may use the same workflow definition files to create the instances. The workflow engine 712 may distinguish between the instances based on, e.g., their identifiers.

In some implementations, the workflow manager 710 may use asynchronous messaging. For example, executing a step in a workflow instance may require information to be provided by a user. Until the user transmits such information to the workflow engine 712, further execution of the workflow instance may be stalled. In some implementations, the workflow instance may enter an interruptible blocking state as the instance waits for a communication with needed information to arrive. The workflow engine 712 may place the workflow instance in a queue. When information needed for a workflow instance is received, the workflow engine 712 may retrieve the workflow instance from the queue and continue executing the workflow instance. The workflow instance may process the information synchronously at specific steps within the workflow.

In some implementations, the notification engine 720 may receive the communication from the user with the information for a workflow instance. However, the workflow engine 712 may be processing a different workflow instance. The notification engine 720 and/or the workflow engine 712 may place the communication in a communication queue. The workflow engine 712 may complete processing of the different workflow instance and/or place the different workflow engine in a workflow instance queue until receipt of further information for that instance is received. The workflow engine 712 may retrieve the communication from the communication queue and the workflow instance corresponding to the communication. The workflow engine 712 may continue execution of the workflow instance corresponding to the received communication.

In some implementations, the workflow manager 710 may place a received communication in a communication processing queue. The workflow manager 710 may place multiple communications in the processing queue. In some implementations, system 700 may include multiple communication processing queues, each queue corresponding to a workflow instance.

In some implementations, the workflow manager 710 may deliver a communication to multiple workflow instances. For example, the workflow coordinator 711 may place a received communication in the communication processing queues for multiple workflow instances. The workflow coordinator 711 may place a communication in multiple processing queues according to correlations between workflow instances and an indicia associated with the communication channel through which the communication was received. For example, a user's mobile phone number, e-mail address, or other indicia may be correllated with more than one workflow instance. The workflow coordinator 711 may place a communication from a user's mobile phone in processing queues for the workflow instances, by way of example. In some implementations, workflow instances may discard communications whose information would not be processed as part of their respective workflows.

In some implementations, the workflow engine 712 may create and/or invoke additional engines (not shown) in the course of executing the workflow instance. For example, the workflow engine 712 may determine that a step in the workflow instance requires use of a particular engine. The processor(s) executing the workflow engine 712 may access memory to retrieve instructions that, when executed, implement the particular engine. Exemplary engines may include engines for communication and engines for specialized functions, although other engines may be used.

In some implementations, a communication engine may enable communicate with a user via short messaging services (SMS), multimedia messaging service (MMS), electronic mail (also referred to herein as "e-mail"), mobile application, and other communication channels described herein. For example, a communication engine may create a message to be sent to a user via SMS. The engine may conform the message to the protocol for SMS, e.g., the Mobile Application Part (MAP) of the SS7 protocol. The engine may send the message to the service provider associated with the user's mobile phone number. In some implementations, the engine may send the message to an aggregator 205, which determines the service provider associated with the mobile phone number and sends the message to that service provide.

In some implementations, a communication engine may be a geolocation engine. A geolocation engine may communicate with at least one of the user's mobile computing devices and/or their associated service providers to obtain the user's geolocation (e.g., latitudinal and longitudinal coordinates). For example, the geolocation engine may request the location of the user's mobile phone from the phone itself. The mobile phone may include a global positioning system (GPS) service. The mobile phone may communicate with the GPS service to obtain its geolocation. The mobile phone may transmit the geolocation provided by the GPS service to the geolocation engine on the system 200. The geolocation engine may send the geolocation to the workflow engine 712 to process in the course of executing a workflow instance step.

In some implementations, a communication engine may be an interactive voice response (IVR) engine. The IVR engine may receive an audio file created by one of the user's devices. The IVR engine may apply a speech recognition algorithm to the audio file. The algorithm may convert the audio signals on the file to text. The IVR engine may send the contents of the text to the workflow engine for processing in the course of executing a workflow instance step.

In some implementations, a specialized engine may interpret barcodes. For example, using a digital camera on a mobile telephone, a user may capture an image of a barcode for a product. The user may transmit the image to the system 200. The workflow engine 712 may be expecting an image with a barcode, due to the current step of the workflow instance. When the workflow engine 712 receives the image, the workflow engine 712 may invoke a barcode engine and send the image to the barcode engine. In some implementations, the barcode engine may process the image to identify a product. The barcode engine may transmit the identity of the product to the workflow engine 712.

In some implementations, a specialized engine may process a payment. For example, the workflow engine 712 may receive instructions from a user to make or receive a payment. The instruction may include the amount for the payment. In some implementations, the instruction may include the routing and account numbers for the user's bank account from which the payment amount should be debited. In some implementations, the instruction may include a credit card number and expiration date to which the payment amount should be charged. In some implementations, the payment engine may send payment information to a third-party vendor to fulfill a transaction. In some implementations, the payment engine may identify the financial institution associated with the bank account or credit card. The payment engine may communicate with the financial institution to process the payment.

In some implementations, the workflow engine 712 may halt execution of a workflow instance. The workflow engine 712 may delete the workflow instance. The workflow engine 712 may send a message indicating the workflow instance has been aborted to the external system 701 that requested the workflow instance. In some implementations, the workflow engine 712 may abort a workflow in response to an instruction from an external system 701 to do so.

In some implementations, the workflow engine 712 may create correlations between a workflow instance and an indicia of a communication channel associated with a user. The workflow engine 712 may send information about the correlations to the session manager 715. In some implementations, the workflow engine 712 may use a specialized component, such as a work item (e.g., a pre-defined structure of work which answers to a requirement of the workflow instance).

In some implementations, the correlation engine 716 may create correlations between workflow instances and indicia of communication channels for a user. In some implementations, the correlation engine 716 may correlate a workflow instance with an indicia by storing the identifier of the instance with the indicia in memory. For example, the correlation engine 716 may maintain a table of workflow instances. The correlation engine 716 may create an entry in the table for an instance. The entry may be accessed by the instance's identifier. The correlation engine 716 may populate fields in the entry with the indicia of communication channels in the user profile. In this manner, each instance of a workflow may be associated with multiple indicia for a user.

In another example, the correlation engine 716 may store a table of indicia in memory. The correlation engine 716 may search the table for the user's indicia. If the indicia is found in table, the correlation engine 716 may add the identifier of the workflow instance to the indicia's entry. If the indicia is not found in the table, the correlation engine 716 may create an entry for the indicia and store the workflow instance's identifier in association with the indicia. In this manner, indicia may be associated with multiple workflow instances.

The correlation engine 716 may receive a communication received from a user. Based on an indicia of a communication channel through which the communication was received, the correlation engine 716 may determine the workflow instance corresponding to the communication.

In operation, the logging engine 718 may create a log of events for the workflow instance. When the session manager 715 receives the identifier of a workflow instance and the indicia (e.g., information from the user profile) for correlation, the logging engine 718 may log (e.g., record a entry for) a start time corresponding to the receipt of the instance's identifier. In some implementations, the workflow engine 712 sends the session manager 715 the time the workflow instance was created. The logging engine 718 may use the provided time as the time of the instance's creation.

In some implementations, the logging engine 718 may record entries regarding communications sent to users by the workflow engine 712 and communications received from users. In some implementations, the workflow engine 712 may send to the session manager 715 a copy of each communication to be sent to a user. The logging engine 718 may log an entry for the workflow instance corresponding to the communication. In some implementations, the entry may include the contents of the communication, the communication channel used (e.g., e-mail, SMS, other channels described herein), the indicia of the communication channel (e.g., e-mail address, mobile telephone number, other indicia described herein), the time the instruction was sent, and/or any other information.

In some implementations, the logging engine 718 may log an entry corresponding to each communication received from the notification engine 720. The entry may include the time the communication was received, the contents of the communication, the type of the communication channel used (e.g., e-mail, SMS), the indicia of the communication channel (e.g., e-mail address, mobile telephone number), and/or any other information.

In some implementations, the logging engine 718 may record an end time for the workflow instance. The workflow engine 712 may send the session manager 715 a message when the workflow instance has been completed. The message may include the instance's identifier, the time of completion, one or more results of the workflow instance, and/or any other information. The logging engine 718 of the session manager 715 may record an entry including any of the information in the message. In some implementations, the workflow engine 712 may send the session manager 715 a message indicating that the workflow instance is being aborted. The logging engine 718 of the session manager 715 may record an entry including the instance's identifier, the time the message was received, an indication (e.g., a flag) that the instance was aborted, and/or any other information. In some implementations, the entry may include the reason the instance was halted.

In some implementations, the logging engine 718 may store the log of the workflow instance. In some implementations, the logging engine 718 may store each entry as an entry is created. In some implementations, the logging engine 718 may store all entries for a workflow instance after the instance completes execution. Thus, such storage enables future retrieval of the results and/or events of the workflow instance. For example, an external system 701 may retrieve results from workflows that the system 701 requested. In another example, if one or more system 700 components fail (e.g., the server executing the workflow engine crashes), the system 700 may retrieve information about the workflow instance to resume execution once such components have been restored.

In some implementations, the logging engine 718 may send the entries of the log to the workflow engine 712 or loader 713 for storage in a workflow definition file store 745. In some implementations, the logging engine 718 may store the entries of the log in one or more memories on the system 700.

In some implementations, the session manager 715 may create and/or invoke additional engines (not shown). The processor(s) executing the session manager 715 may access memory to retrieve instructions that, when executed, implement one or more administrative engines. In some implementations, an administrative engine may manage system 700 resources during execution of a workflow instance. For example, the administrative engine may delete correlations between workflow instances and indicia of communication channels associated with users.

The administrative engine may receive an instruction to delete a correlation between a workflow instance and an indicia of a communication channel associated with a user (e.g., a user's mobile phone number). In some implementations, the administrative engine may receive the instruction if the workflow engine 712 determines that a communication channel will not be used in remaining steps of the workflow instance. A correlation may be deleted by removing an indicia of a communication channel from an entry for the workflow instance in a table of workflow instances.

The administrative engine may receive an instruction to delete all correlations for a workflow instance. In some implementations, the administrative engine may receive the instruction if the workflow engine 712 has completed execution of the instance. Correlations for a completed workflow instance may be deleted by deleting the entry corresponding to the workflow instance from the table of workflow instances.

In some implementations, the receive dispatch engine may receive a communication from a user. The receive dispatch engine may receive the communication from a receive queue of messages. In some implementations, the receive dispatch engine may send the communication to the correlation engine 716 of the session manager 715 to determine the workflow instance corresponding to the communication. In some implementations, the receive dispatch engine may send the communication to a workflow coordinator 711, and the workflow coordinator 711 may send the communication to the correlation engine 716. In some implementations, the receive dispatch engine may include a Java class, such as a Message Driven Bean.

As shown in FIG. 8, an implementation of an exemplary cloud computing environment 800 for subscription management in a multi-channel context aware communication environment is shown and described. The cloud computing environment 800 may include one or more resource providers 802a, 802b, 802c (collectively, 802). Each resource provider 802 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 802 may be connected to any other resource provider 802 in the cloud computing environment 800. In some implementations, the resource providers 802 may be connected over a computer network 808. Each resource provider 802 may be connected to one or more computing device 804a, 804b, 804c (collectively, 804), over the computer network 808.

The cloud computing environment 800 may include a resource manager 806. The resource manager 806 may be connected to the resource providers 802 and the computing devices 804 over the computer network 808. In some implementations, the resource manager 806 may facilitate the provision of computing resources by one or more resource providers 802 to one or more computing devices 804. The resource manager 806 may receive a request for a computing resource from a particular computing device 804. The resource manager 806 may identify one or more resource providers 802 capable of providing the computing resource requested by the computing device 804. The resource manager 806 may select a resource provider 802 to provide the computing resource. The resource manager 806 may facilitate a connection between the resource provider 802 and a particular computing device 804. In some implementations, the resource manager 806 may establish a connection between a particular resource provider 802 and a particular computing device 804. In some implementations, the resource manager 806 may redirect a particular computing device 804 to a particular resource provider 802 with the requested computing resource.

Figure 9:
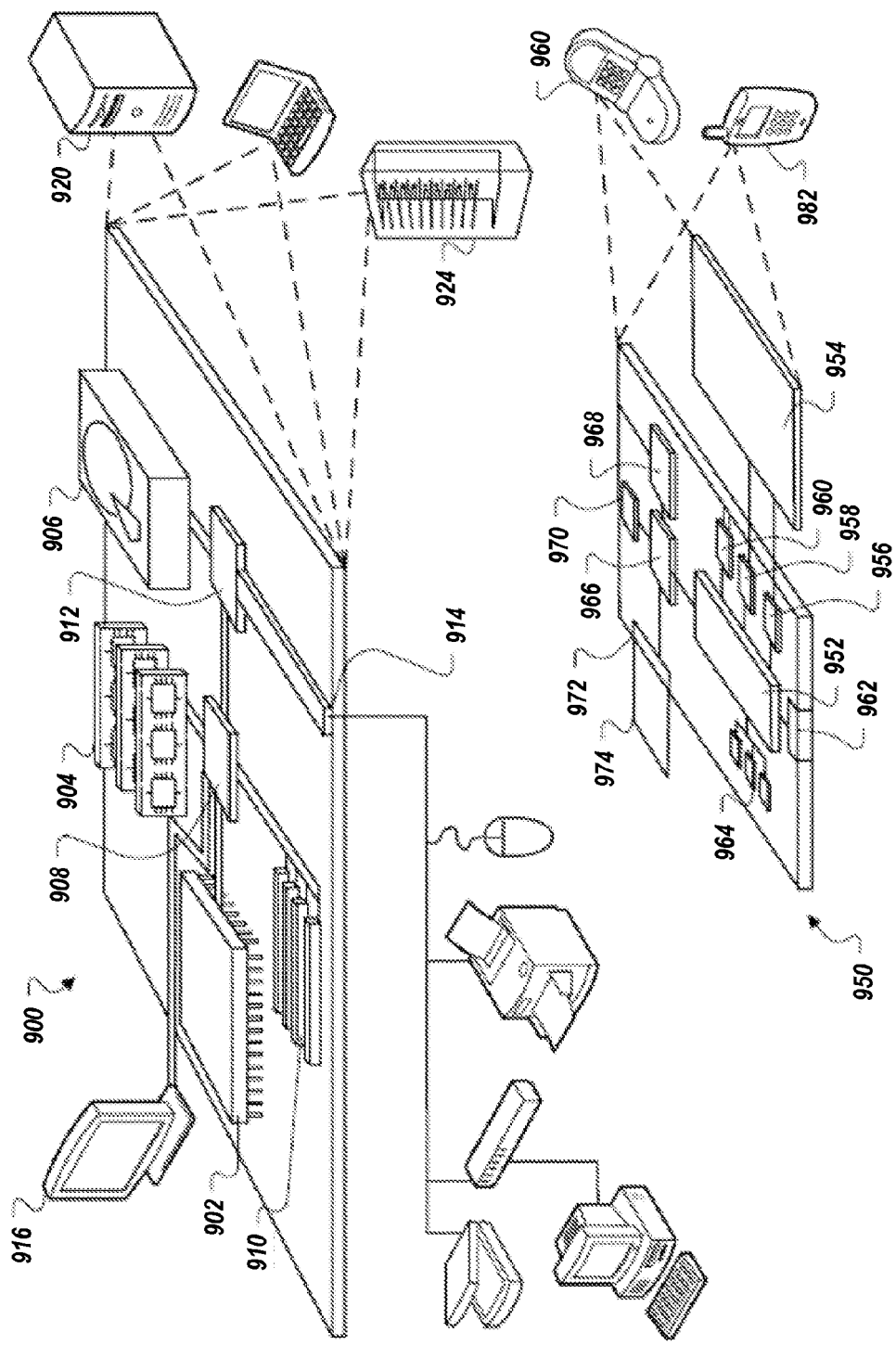
FIG. 9 is a block diagram of a computing device and a mobile computing device.

FIG. 9 shows an example of a computing device 900 and a mobile computing device 950 that can be used to implement the techniques described in this disclosure. The computing device 900 is intended to represent various forms of digital computers, such as laptops, desktops, workstations, personal digital assistants, servers, blade servers, mainframes, and other appropriate computers. The mobile computing device 950 is intended to represent various forms of mobile devices, such as personal digital assistants, cellular telephones, smartphones, and other similar computing devices. The components shown here, their connections and relationships, and their functions, are meant to be examples only, and are not meant to be limiting.

The computing device 900 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the high-speed expansion ports 910, and the low-speed interface 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as a display 916 coupled to the high-speed interface 908. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 904 stores information within the computing device 900. In some implementations, the memory 904 is a volatile memory unit or units. In some implementations, the memory 904 is a non-volatile memory unit or units. The memory 904 may also be another form of computer-readable medium, such as a magnetic or optical disk.

The storage device 906 is capable of providing mass storage for the computing device 900. In some implementations, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 902), perform one or more methods, such as those described above. The instructions can also be stored by one or more storage devices such as computer- or machine-readable mediums (for example, the memory 904, the storage device 906, or memory on the processor 902).

The high-speed interface 908 manages bandwidth-intensive operations for the computing device 900, while the low-speed interface 912 manages lower bandwidth-intensive operations. Such allocation of functions is an example only. In some implementations, the high-speed interface 908 is coupled to the memory 904, the display 916 (e.g., through a graphics processor or accelerator), and to the high-speed expansion ports 910, which may accept various expansion cards (not shown). In the implementation, the low-speed interface 912 is coupled to the storage device 906 and the low-speed expansion port 914. The low-speed expansion port 914, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. In addition, it may be implemented in a personal computer such as a laptop computer 922. It may also be implemented as part of a rack server system 924. Alternatively, components from the computing device 900 may be combined with other components in a mobile device (not shown), such as a mobile computing device 950. Each of such devices may contain one or more of the computing device 900 and the mobile computing device 950, and an entire system may be made up of multiple computing devices communicating with each other.

The mobile computing device 950 includes a processor 952, a memory 964, an input/output device such as a display 954, a communication interface 966, and a transceiver 968, among other components. The mobile computing device 950 may also be provided with a storage device, such as a microdrive or other device, to provide additional storage. Each of the processor 952, the memory 964, the display 954, the communication interface 966, and the transceiver 968, are interconnected using various buses, and several of the components may be mounted on a common motherboard or in other manners as appropriate.

The processor 952 can execute instructions within the mobile computing device 950, including instructions stored in the memory 964. The processor 952 may be implemented as a chipset of chips that include separate and multiple analog and digital processors. The processor 952 may provide, for example, for coordination of the other components of the mobile computing device 950, such as control of user interfaces, applications run by the mobile computing device 950, and wireless communication by the mobile computing device 950.

The processor 952 may communicate with a user through a control interface 958 and a display interface 956 coupled to the display 954. The display 954 may be, for example, a TFT (Thin-Film-Transistor Liquid Crystal Display) display or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may provide communication with the processor 952, so as to enable near area communication of the mobile computing device 950 with other devices. The external interface 962 may provide, for example, for wired communication in some implementations, or for wireless communication in other implementations, and multiple interfaces may also be used.

The memory 964 stores information within the mobile computing device 950. The memory 964 can be implemented as one or more of a computer-readable medium or media, a volatile memory unit or units, or a non-volatile memory unit or units. An expansion memory 974 may also be provided and connected to the mobile computing device 950 through an expansion interface 972, which may include, for example, a SIMM (Single In Line Memory Module) card interface. The expansion memory 974 may provide extra storage space for the mobile computing device 950, or may also store applications or other information for the mobile computing device 950. Specifically, the expansion memory 974 may include instructions to carry out or supplement the processes described above, and may include secure information also. Thus, for example, the expansion memory 974 may be provide as a security module for the mobile computing device 950, and may be programmed with instructions that permit secure use of the mobile computing device 950. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 952), perform one or more methods, such as those described above. The instructions can also be stored by one or more storage devices, such as one or more computer- or machine-readable mediums (for example, the memory 964, the expansion memory 974, or memory on the processor 952). In some implementations, the instructions can be received in a propagated signal, for example, over the transceiver 968 or the external interface 962.

The mobile computing device 950 may communicate wirelessly through the communication interface 966, which may include digital signal processing circuitry where necessary. The communication interface 966 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 968 using a radio-frequency. In addition, short-range communication may occur, such as using a Bluetooth®, Wi-Fi™, or other such transceiver (not shown). In addition, a GPS (Global Positioning System) receiver module 970 may provide additional navigation- and location-related wireless data to the mobile computing device 950, which may be used as appropriate by applications running on the mobile computing device 950.

The mobile computing device 950 may also communicate audibly using an audio codec 960, which may receive spoken information from a user and convert it to usable digital information. The audio codec 960 may likewise generate audible sound for a user, such as through a speaker, e.g., in a handset of the mobile computing device 950. Such sound may include sound from voice telephone calls, may include recorded sound (e.g., voice messages, music files, etc.) and may also include sound generated by applications operating on the mobile computing device 950.

The mobile computing device 950 may be implemented in a number of different forms, as shown in the figure. For example, it may be implemented as a cellular telephone 980. It may also be implemented as part of a smart-phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal.

The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In view of the structure, functions and apparatus of the systems and methods described here, in some implementations, systems and methods for subscription management in a multi-channel context aware communication environment are provided. Having described certain implementations of methods and apparatus for supporting subscription management in a multi-channel context aware communication environment, it will now become apparent to one of skill in the art that other implementations incorporating the concepts of the disclosure may be used. Therefore, the disclosure should not be limited to certain implementations, but rather should be limited only by the spirit and scope of the following claims.

What is claimed:

1. A method comprising:
   receiving, via a first network, a message identifying an event, wherein the event is associated with an entity, and the event is destined for at least one user;
   determining, by a processor of a computing device, a type of the event;
   accessing, by the processor, a user profile associated with a first user of the at least one user, wherein the user profile associates the first user with the entity;
   determining, by the processor, a communication channel for delivering information associated with the event to the first user, wherein the user profile comprises an association between the communication channel and the type of the event, and wherein prior to determining the communication channel:
      determining, by the processor, a second communication channel, wherein the second communication channel is determined based in part upon the type of the event and based further in part upon the user profile, wherein the user profile identifies the second communication channel as a primary communication channel;
   forwarding, via a third network, the information associated with the event, wherein the information associated with the event is forwarded via the second communication channel, and
   receiving, via the third network, an indication of failure of delivery of the information associated with the event via the second communication channel; and
   forwarding, via a second network, to the first user, the information associated with the event, wherein the information associated with the event is forwarded via the communication channel.

2. The method of claim 1, wherein the communication channel is one of a telephone number, an email address, a social networking account, a software application, and a machine-to-machine alias.

3. The method of claim 1, wherein forwarding the information associated with the event comprises forwarding the event as one of an SMS message, an email message, and a social networking message.

4. The method of claim 1, wherein the type comprises a priority level.

5. The method of claim 1, further comprising, prior to forwarding the information associated with the event, formatting the information associated with the event based at least in part upon the communication channel.

6. The method of claim 1, wherein a message content associated with the event comprises a rich media format, the second communication channel comprises an SMS message, and formatting the information associated with the event comprises reducing the message content to plain text.

7. The method of claim 1, further comprising:
   receiving, via the first network, a second event, wherein the second event is associated with a second entity, and the second event is destined for the first user;
   determining, by the processor, a type associated with the second event, wherein the type associated with the second event is different than the type associated with the event;
   accessing, by the processor, the user profile associated with the first user;
   determining, by the processor, based at least in part upon the type of the second event, the first user has not designated a communication channel corresponding to the second event; and
   discarding, by the processor, the second event.

8. A system comprising:
   a processor; and
   a memory, the memory storing instructions that, when executed by the processor, cause the processor to:
      receive, via a network, identification of a plurality of communication channels associated with a user, wherein the plurality of communication channels comprise at least one of an email address, a telephone number, a social media account, a software application, and a machine-to-machine alias;
      create a user profile comprising the plurality of communication channels;
      receive an indication of a plurality of associations, wherein each association of the plurality of associations correlates a respective communication channel with a respective event type, wherein each event type of a plurality of event types comprises at least one of an entity, a service type, and a priority;

store information regarding the plurality of associations in the user profile; receive an event destined for the user;

determine a type of the event, wherein the plurality of event types comprises the type;

based upon the user profile, match the type of the event to a first communication channel of the plurality of communication channels, wherein prior to matching the type of the event to a first communication channel, determine a second communication channel, wherein the second communication channel is determined based in part upon the type of the event and based further in part upon the user profile, wherein the user profile identifies the second communication channel as a primary communication channel, forward, via a third network, the information associated with the event, wherein the information associated with the event is forwarded via the second communication channel; and receive, via the third network, an indication of failure of delivery of the information associated with the event via the second communication channel; and forward, via a second network, to the user, information associated with the event via the first communication channel.

9. The system of claim 8, wherein the first communication channel comprises a software application, and wherein the instructions, when executed, cause the processor to:

receive, from a separate computing device executing the software application, peripheral data, wherein the peripheral data is obtained from a peripheral feature of the separate computing device;

identify, based at least in part upon the peripheral data, one or more contextual events;

provide, for presentation to the user via at least one communication channel of the plurality of communication channels, information associated with the one or more contextual events.

10. The system of claim 9, wherein the peripheral feature comprises one of a geolocation feature, an electronic wallet feature, a near field communication feature, an optical imaging feature, a graphic image capture feature, an audio capture feature, and a biometric feature.

11. The system of claim 9, wherein the instructions, when executed, cause the processor to:

access user data from a storage device, wherein
identifying the one or more contextual events comprises identifying a first contextual event of the one or more contextual events based further in part on the user data.

12. The system of claim 8, wherein:
each service type comprises a privacy level; and
forwarding the information associated with the event via the first communication channel comprises securing the information associated with the event relative to the privacy level of a respective service type of the event.

13. A non-transitory computer readable medium having instructions stored thereon, wherein the instructions, when executed by a processor, cause the processor to:

receive, via a network, identification of a plurality of communication channels and a plurality of information items associated with a user, wherein a first information item of the plurality of information items comprises at least one of a user name, a birth date, a home address, an account number, an image file, an audio file, a video file, and a biometric value;

create a user profile comprising the plurality of communication channels and the plurality of information items, wherein creating the user profile comprises associating, with each information item of the plurality of information items, at least one of a creation date, an expiration date, a privacy level, and a security level;

receive an indication of a plurality of associations, wherein each association of the plurality of associations correlates a respective communication channel with at least one of an entity, a service type, a security level, and a priority level;

store information regarding the plurality of associations in the user profile;

receive an event destined for the user;

match the event to a first communication channel of the plurality of communication channels, wherein the event is matched to the first communication channel based at least in part on one or more of a respective entity, a respective service type, a respective security level, and a respective priority level of the event, wherein prior to matching the event to a first communication channel:

determine a second communication channel, wherein the second communication channel is determined based in part upon at least one of the entity, the expiration date, the privacy level, and the security level and based further in part upon the user profile, wherein the user profile identifies the second communication channel as a primary communication channel, forward, via a third network, the information associated with the event, wherein the information associated with the event is forwarded via the second communication channel, and receive, via the third network, an indication of failure of delivery of the information associated with the event via the second communication channel; and forward, via a second network, to the user, information associated with the event via the first communication channel.

14. The computer readable medium of claim 13, wherein the instructions further cause the processor to, after creating the user profile:

receive an update to a first information item of the plurality of information items, wherein the update comprises a modification to one or more of the respective privacy level and the respective security level; and associate update information with the first information item, wherein the update information comprises one or more of an update date, an update timestamp, and an updator.

15. The computer readable medium of claim 13, wherein the instructions, when executed, further cause the processor to:

identify availability of a new information item, wherein the new information item is provided on behalf of an entity;
determine that the user profile is associated with the entity;
alert, via a communication channel associated with the user profile, the user to the availability of the new information item;

responsive to alerting the user of the availability of the new information item,
receive new user profile information related to the new information item, and
populate the new information item with the new user profile information, wherein a respective privacy level of the new information item allows for sharing of the new user profile information with one or more additional entities different than the entity; and provide, based at least in part upon the respective privacy level of the new information item, the new user profile information to at least one of the one or more additional entities.

16. The computer readable medium of claim 15, wherein the instructions cause the processor to, prior to providing the new user profile information to at least one of the one or more additional entities, receive, from the at least one of the one or more additional entities, a request for access to the new information item.

17. The computer readable medium of claim 15, wherein providing the new user profile information to the at least one of the one or more additional entities comprises allocating compensation for sharing the new user profile information.

18. The computer readable medium of claim 17, wherein the compensation comprises one or more of a points value, a coupon, and a gift certificate.

19. The computer readable medium of claim 18, wherein allocating compensation comprises adding funds to a financial account associated with the user profile.

* * * * *